US012800338B2

(12) United States Patent
Kok et al.

(10) Patent No.: US 12,800,338 B2
(45) Date of Patent: Nov. 17, 2026

(54) METHOD AND SYSTEM FOR ADAPTIVELY DIVIDING GRAPH NETWORK INTO SUBNETWORKS

(71) Applicant: GRABTAXI HOLDINGS PTE. LTD., Singapore (SG)

(72) Inventors: Johan Zhi Kang Kok, Singapore (SG); Suriyanarayanan Venkatesan, Singapore (SG); Sien Yi Tan, Singapore (SG); Feng Cheng, Singapore (SG); Bingsheng He, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 186 days.

(21) Appl. No.: 18/835,179

(22) PCT Filed: Mar. 28, 2023

(86) PCT No.: PCT/SG2023/050204
§ 371 (c)(1),
(2) Date: Aug. 1, 2024

(87) PCT Pub. No.: WO2023/191717
PCT Pub. Date: Oct. 5, 2023

(65) Prior Publication Data
US 2025/0146834 A1 May 8, 2025

(30) Foreign Application Priority Data
Apr. 1, 2022 (SG) .......................... 10202203388W

(51) Int. Cl.
*G01C 21/00* (2006.01)
*G06N 3/045* (2023.01)

(52) U.S. Cl.
CPC ........ *G01C 21/3811* (2020.08); *G01C 21/387* (2020.08); *G06N 3/045* (2023.01)

(58) Field of Classification Search
CPC .............. G01C 21/3811; G01C 21/387; G01C 21/3874; G06N 3/045; G06N 3/096;
(Continued)

(56) References Cited

U.S. PATENT DOCUMENTS 5,748,844 A 5/1998 Marks
9,208,257 B2 12/2015 Milenova et al.
(Continued)

FOREIGN PATENT DOCUMENTS

CN 105869401 A * 8/2016 ............. G06F 17/16
CN 107341733 A 11/2017
(Continued)

OTHER PUBLICATIONS

Machine translation of CN 105869401A (Year: 2016).*
(Continued)

*Primary Examiner* — Anne Marie Antonucci
*Assistant Examiner* — Jordan T Smith
(74) *Attorney, Agent, or Firm* — Buckley, Maschoff & Talwalkar LLC

(57) ABSTRACT

The present disclosure provides a method and a system for adaptively dividing a graph network comprising a plurality of nodes, each of the plurality of nodes being connected to at least one other node of the plurality of nodes, the method comprising: for each pair of subnetworks from a plurality of subnetworks within the graph network, calculating an association score based on a first accuracy metric in predicting a first latent attribute of at least one first node of a first subnetwork of the each pair of subnetworks using parameters optimized for accurately predicting a second latent attribute of at least one second node of a second subnetwork of the each pair of subnetworks; and forming one of a plurality of new subnetworks within the graph network from each pair of a pair set of subnetworks from the plurality of
(Continued)

subnetworks based on a result of determining a sum of the association scores of the pair set of subnetworks is higher than that of another pair set of subnetworks from the plurality of subnetworks.

20 Claims, 15 Drawing Sheets

(58) Field of Classification Search
CPC .. G06N 3/0464; G06N 3/0475; G06N 3/0495; G06N 3/0499; G06N 3/0895; G06N 3/0985; G06F 16/29
See application file for complete search history.

(56) References Cited

U.S. PATENT DOCUMENTS

| | | | | |
|---|---|---|---|---|
| 11,308,066 | B1 * | 4/2022 | Li | G06F 16/278 |
| 11,941,892 | B2 * | 3/2024 | Naseer | G01C 21/3804 |
| 12,423,074 | B1 * | 9/2025 | Fan | G06F 9/54 |
| 2010/0299370 | A1 * | 11/2010 | Otto | G09B 29/003 707/E17.005 |
| 2012/0283948 | A1 * | 11/2012 | Demiryurek | G01C 21/3492 701/533 |
| 2014/0028036 | A1 | 1/2014 | Akizuki et al. | |
| 2014/0119674 | A1 * | 5/2014 | Das | G01C 21/206 382/284 |
| 2015/0302346 | A1 * | 10/2015 | Kishore | G06Q 10/06 705/7.17 |
| 2020/0151197 | A1 * | 5/2020 | Guo | G06F 16/278 |
| 2020/0334495 | A1 * | 10/2020 | Al-Rfou | G06F 18/29 |
| 2020/0393252 | A1 * | 12/2020 | Bush | G01C 21/32 |
| 2021/0286829 | A1 * | 9/2021 | Nonez | G06F 16/909 |
| 2021/0341308 | A1 * | 11/2021 | Ivanov | G01C 21/3837 |
| 2021/0343142 | A1 * | 11/2021 | Lewis | G01S 19/01 |
| 2022/0138260 | A1 * | 5/2022 | Koval | G01C 21/3841 707/798 |
| 2022/0161817 | A1 * | 5/2022 | Anastassov | B60W 60/0011 |
| 2022/0180214 | A1 * | 6/2022 | Cervantes | G06N 20/00 |
| 2023/0281430 | A1 * | 9/2023 | Sinop | G06N 3/0455 706/15 |

FOREIGN PATENT DOCUMENTS

| | | | |
|---|---|---|---|
| CN | 111061624 | A | 4/2020 |
| WO | 2021190761 | A1 | 9/2021 |

OTHER PUBLICATIONS

International Search Report and Written Opinion dated Aug. 28, 2023 which was issued in connection with PCT/SG2023/050204.

Ding et. al.: "A Min-max Cult Algorithm for Graph Partitioning and Data Clustering", Proceedings 2001 IEEE International Conference on Data Mining, San Jose, CA, USA, 2001, pp. 107-114, doi: 10.1109/ICDM.2001.989507.

Zhang et. al.: "Adgraph—Accurate, Distributed Training on Large Graphs" National University of Defence Technology, China.

Chiang et. al.: "Cluster-GCN—An Efficient Algorithm for Training Deep and Large Graph Convolutional Networks" Cornell University, arXiv:1905.07953v2 May 20, 2019.

Nazi et. al.: "GAP—Generalizable Approximate Graph Partitioning Framework", Cornell University, arXiv:1903.00614v1, Mar. 2, 2019.

Xu et. al.: "Graph Partitioning and Graph Neural Network based Hierarchical Graph Matching for Graph Similarity Computation", Neurocomputing, vol. 439, 2021, pp. 348-362, ISSN 0925-2312, https://doi.org/10.1016/j.neucom.2021.01.068.

Zainab Abbas: "Scalable Streaming Graph and Time Series Analysis Using Partitioning and Machine Learning" Université catholique de LouvainLouvain-la-neuve, Belgium, 2021—Uploaded in Three Parts.

* cited by examiner

METHOD AND SYSTEM FOR ADAPTIVELY DIVIDING GRAPH NETWORK INTO SUBNETWORKS

This application is a US National Stage Application pursuant to 35 USC 371claiming benefit of and priority to International Application No. PCT/SG2023/050204, filed on Mar. 28, 2023, and claiming priority to Singapore application Ser. No. 10/202203388W filed on Apr. 1, 2022, each of which are hereby incorporated by reference herein in its entirety.

TECHNICAL FIELD

The present invention relates generally to a system and a method for adaptively dividing a graph network into a plurality of subnetworks.

BACKGROUND

Graph neural networks can be trained for geographical mapping application, for example, based on locations of existing interconnected nodes (e.g., point of interest (POI)) within a graph network (e.g., map), to identify how the nodes are scattered across the network, classify the nodes. This allows better route planning and better resource allocations for a certain subnetwork, especially region with high POI concentrations as well as make predictions on the subnetwork in which a new or unknown POI is located.

However, such graph neural network may not be accurate for countries or cities with localized clusters of POIs due to geospatial concept drift, in which the statistical distribution of POIs varies from one region to another within a single country or city. To address geospatial concept drift, one method is to divide large POI graph network into multiple subnetwork and assign a single set of parameters (e.g., model) to be trained and optimized in each subnetwork. This can be done using graph partitioning algorithms. However, the objectives of these algorithms are to divide the graph based on present connectivity and structure and not necessarily to maximize model learning and parameters optimization. In addition, these algorithms do not take into account the different available choices of graph partitioning models and parameters from the user, implying that certain graph models and parameters would fare much worse under the same partitioning algorithm.

There is thus a need to devise a novel method and system for adaptively dividing a graph network into a plurality of subnetworks to address the issues, more particularly, to improve the applicability of graph partitioning algorithm to all types of graph and choice of graph models and parameters.

Furthermore, other desirable features and characteristics will become apparent from the subsequent detailed description and the appended claims, taken in conjunction with the accompanying drawings and this background of the disclosure.

SUMMARY

In a first aspect, the present disclosure provides a method for adaptively dividing a graph network, the graph network comprising a plurality of nodes, each of the plurality of nodes being connected to at least one other node of the plurality of nodes, the method comprising: for each pair of subnetworks from a plurality of subnetworks within the graph network, calculating an association score based on a first accuracy metric in predicting a first latent attribute of at least one first node of a first subnetwork of the each pair of subnetworks using parameters optimized for accurately predicting a second latent attribute of at least one second node of second subnetwork of the each pair of subnetworks; and forming one of a plurality of new subnetworks within the graph network from each pair of a pair set of subnetworks from the plurality of subnetworks based on a result of determining a sum of the association scores of the pair set of subnetworks is higher than that of another pair set of subnetworks from the plurality of subnetworks.

In a second aspect, the present disclosure provides a system for adaptively dividing a graph network, the graph network comprising a plurality of nodes, each of the plurality of nodes being connected to at least one other node of the plurality of nodes, the system comprising: at least one processor; and at least one memory including computer program code; the at least one memory and the computer program code configured to, with at least one processor, cause the server at least to: for each pair of subnetworks from a plurality of subnetworks within the graph network, calculate an association score based on a first accuracy metric in predicting a first latent attribute of at least one first node of a first subnetwork of the each pair of subnetworks using parameters optimized for accurately predicting a second latent attribute of at least one second node of a second subnetwork of the each pair of subnetworks; and form one of a plurality of new subnetworks within the graph network from each pair of a pair set of subnetworks from the plurality of subnetworks based on a result of determining a sum of the association scores of the pair set of subnetworks is higher than that of another pair set of subnetworks from the plurality of subnetworks.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

Figure 1:
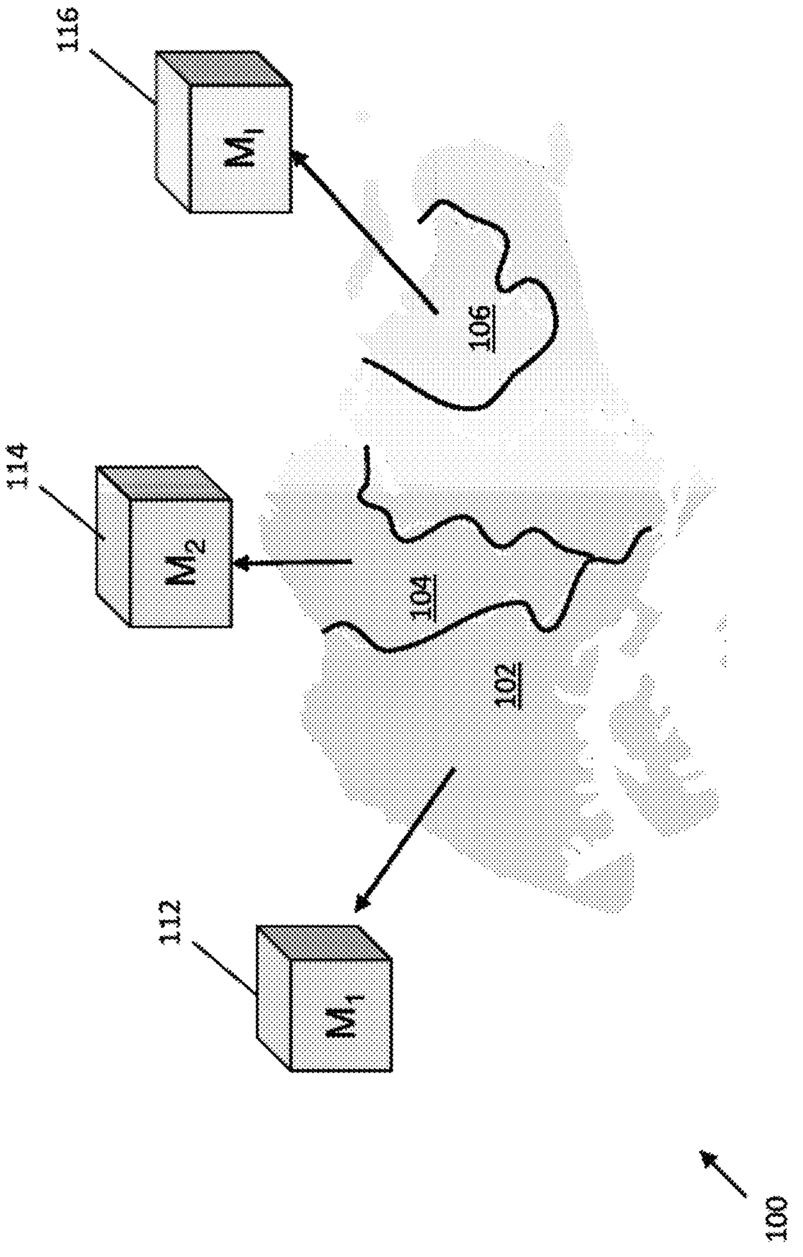
FIG. 1 shows various segmented regions in a Singapore map and their boundaries determined by graph neural networks respectively allocated to the segmented regions according to an embodiment of the present disclosure.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of this invention to present a service request allocation system and method under lack of available service providers condition.

Terms Description

Graph network—a graph network (also called network diagram) is a type of data representation and visualization that shows interconnections between a set of data in the form of nodes. The connections between nodes are typically represented through links or edges to shows the type of relationship and/or dependency between the nodes. It can be used to interpret the structure of a network through looking for any clustering of the nodes, how densely the nodes are connected or by how the diagram layout is arranged.

Node—a node represents a data point and is connected to at least one other node through links or edges, thereby forming a graph network. A graph network of nodes can be directed/undirected and/or weighted/unweighted depending on the features of data entries. In the context of routing a map, the graph network may be directed. In various embodiments below, a node may represent a road or the like on a map from which one or more points of interest on the map are accessible; a link or edge may represent connection between two roads for example when both roads are physically connected. Additionally or alternatively, a weighted graph network may use to illustrate the weight or relevancy of a node with respect to other nodes, for example by taking into account a count, a frequency of each data point (node) in the data entries. In various embodiments below, the term "node" may be used interchangeably with "vertex", and may be denoted using letter V.

Subnetwork—a subnetwork is a partition of a graph network comprising a cluster or group of nodes within the graph network. Conventionally, nodes with similar data are classified and grouped together under a same subnetwork and thereby dividing the graph network into multiple subnetworks. In an embodiment, each node may be exclusively grouped into only one subnetwork, therefore the subnetworks are mutually exclusive. In such embodiment, boundaries of between a subnetwork and another subnetwork(s) within the graph network can be identified from the links that connect the nodes of the subnetwork to the nodes of the other subnetwork(s). In the context of a graph network being a map, a subnetwork may refer to a submap, region or area of the map. In various embodiments below, the term "subnetwork" may be used interchangeably with "cluster" or "partition".

Subnetwork pair—in various embodiments below, each subnetwork is paired with another subnetwork to form a subnetwork pair, and all subnetwork pairs within the graph network will form a pair set (combination). For example, four subnetworks can form two pairs but have three different pair sets. An optimal pair set may be determined and selected, for example, based on a sum of association scores of the pair set, and each subnetwork pair (e.g., subnetworks A and B) may be merged to form a single larger subnetwork (herein may referred to as "new subnetwork") within the graph network (e.g., subnetwork A'). In various embodiments below, the term "pair set" may be used interchangeably with "pair combination".

Parameter—a parameter is used by a graph neural network to process data, for example, data relating to a plurality of subnetworks (partitions) in a graph network, and determine, categorize and/or predict a latent attribute of a node. In various embodiments of the present disclosure, such parameter is optimized by a graph neural network based on existing data to better process new data. In various embodiments of the present disclosure, more than one graph neural network, each having its own set of parameters, is allocated to operate in each subnetwork. Each graph neural network is trained and its parameters are optimized only on its allocated subnetwork using data of the nodes in the subnetwork. In one embodiment, every subnetwork within the graph network is allocated with a common graph neural network having a common set of parameters which then is optimized separately based on its own data. In an alternatively embodiment, different graph neural networks having different set of parameters may be selected for different subnetworks.

In various embodiments below, a set of parameters of a graph neural network may be denoted using the letter "M". For example, a set of parameters of a graph neural network optimized on/for a subnetwork A is denoted as $M_A$. The parameters set $M_A$ is optimized such that it can be used to perform an algorithm(s) to determine, categorize and/or predict a latent attribute of each node (or a new node) in the subnetwork A. Similarly, respective sets of parameters of two or more graph neural networks optimized on/for a subnetwork A are denoted as $M_{A1}$, $M_{A2}$, etc.

Latent attribute—a latent attribute or latent variable is hidden feature and information associated with a node which are not used as a basis to connect nodes to form a graph network and reflected in the connections of the graph network. Each node may be associated with multiple latent attributes or types of latent attributes. In the context of a map where a node is a road, examples of latent attributes includes number of POIs that are accessible from the road, a type of the roadway, an average traffic speed on the road at any given time, an average number of vehicles traversing the road at any given time.

Accuracy metric—an accuracy metric is a measurement of accuracy of a set of parameters can accurately determine, categorize and predict a latent attribute of a node in a map or a subnetwork. Such accuracy metric can be used to calculate association score of a subnetwork pair to determine whether to merge two different subnetworks into a single larger new subnetwork. Additionally or alternatively, such accuracy metric can be used to determine a target node from a subnetwork and a reassignment score of another subnetwork to determine whether to reassign the target node to the other subnetwork and refine or shifting the boundary between the subnetwork pair. More details relating to the association score and reassignment score will be discussed below.

In one embodiment, an accuracy metric can be calculated by running a node through a graph neural network to obtain a labelled score, and this labelled score is then compared to the true label/or known latent attribute of the node to obtain the accuracy metric. Alternatively, the labelled score is compared to the true label/known latent attribute of the node to obtain a interference loss in the graph neural network, and the accuracy metric of the graph neural network in predicting the latent attribute of the node is derived from the loss.

Association score—an association score relates to a suitability of a set of parameters optimized for a subnetwork (e.g., subnetwork A) in accurately determining or predicting a latent attribute of one or more nodes of another subnetwork, and vice versa. It is a score that is calculated to determine a subnetwork pair (e.g., subnetworks A and B) within a graph network can be merged into one single, larger new subnetwork (e.g., subnetwork A'). In various embodiment below, an association score of subnetworks A and B is denoted as $S(M_A, M_B)$ or $S_{merge}(M_A, M_B)$. Such association score of a subnetworks A and B is calculated based on the accuracy metric of a set of parameters optimized for subnetwork A in accurately predicting a latent attribute of one or more nodes of subnetwork B and/or the accuracy metric of a set of parameters optimized for subnetwork B to accurately predicting a latent attribute of one or more nodes of subnetwork A. Additionally, the association score is calculated further based on a degree of connectedness, e.g., the number of links, between nodes in the subnetwork pairs.

In various embodiments, a higher association score indicates a greater suitability of a set of parameters optimized for a subnetwork in a subnetwork pair in accurately determining (or a worse suitability of a set of parameters optimized for a subnetwork in accurately determining) a latent attribute of a node of its counterpart subnetwork and vice versa.

In various embodiments, an association score of each different subnetwork pair within the graph network is calculated, and, for each pair set (combination), the association score of each subnetwork pair of the pair set will be summed up to determine an optimal pair set from the different pair sets of the subnetworks. For example, when there are four subnetworks (e.g., subnetworks A, B, C and D) within a graph network, there are three different pair sets and therefore three different sums of association scores of the subnetwork pairs are calculated. An optimal pair set may be selected from that with the highest sum among the sums of association scores. Each subnetwork pair (e.g., subnetwork pair A and B and subnetwork pair C and D) of the optima pair set may then be merged to form a single larger new subnetwork within the graph network (e.g., subnetworks A' and C'). In one embodiment, such boundary shifting is achieved by (re-)identifying, (re-)determining or (re-)categorizing each node in two subnetworks in a subnetwork pair (e.g., subnetworks A and B) in the pair set of subnetworks as a node of a single larger new subnetwork (e.g., subnetwork A').

Reassignment score—a reassignment score relates to a suitable of a set of parameters optimized for a subnetwork (subnetwork A) in accurately predicting a latent attribute of a target node from another subnetwork (e.g., subnetwork B). It is a score that is calculated to determine a subnetwork (e.g., subnetwork A) to reassign a target node from a target subnetwork (e.g., subnetwork B), where a target node is a node identified from a target subnetwork (e.g., subnetwork B) based on an accuracy metric in predicting a latent attribute of the node by the parameters optimized for the target subnetwork. For example, by comparing the accuracy metric predicting the latent attribute of each nodes within the target subnetwork by the set of parameters optimized for the target subnetwork, a node with the lowest accuracy metric in predicting its latent attribute by the set of parameters optimized for the target subnetwork may be identified as a target node. In another embodiment, a node(s) with an accuracy metric in predicting its latent attribute is lower than a threshold accuracy metric will be identified as a target node(s).

A reassignment score of another subnetwork (e.g., subnetwork A) is calculated based on the accuracy metric for a set of parameters optimized for the other subnetwork in accurately predicting the latent attribute of the target node from the target subnetwork. Additionally, the reassignment score is calculated further based on a degree of connectedness, e.g., the number of links, between nodes in subnetworks A and B.

A higher reassignment score indicates a greater suitability of a set of parameters optimized for a subnetwork in accurately determining or predicting the latent attribute the target node from the target subnetwork.

In various embodiments, upon identifying a target node, a reassignment score may be calculated for every other subnetwork, apart from the target subnetwork in which the target node belongs, and a subnetwork is selected from that with the highest reassignment score. The target subnetwork (e.g., subnetwork B) and the selected subnetwork (e.g., subnetwork A) may then be reformed by removing the target node from the target subnetwork and identifying the selected subnetwork to further comprise the target node (i.e., the target node becomes one of the node of the selected subnetwork). As a result of such reassignment or migration of the target node, the boundary between the target subnetwork and the selected subnetwork in the graph network is refined. The process may be repeated with another node of the target subnetwork or a node of other subnetwork(s) until an optimal partition boundary in the graph network is obtained. In one embodiment, such boundary shifting is achieved by (re-)determining or (re-)categorizing the target node in the target subnetwork to be in the other subnetwork.

Exemplary Embodiments

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which form public knowledge through their use. Such should not be interpreted as a representation by the present inventor(s) or the patent applicant that such devices in any way form part of the common general knowledge in the art.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

To reduce reliance on 3rd party mapping applications, it is essential for map-related application such as ride hailing application to create an internal knowledge base of point of interest (POI) waypoints. While open-sourced map, such as the Open Street Map (OSM) exists, the information contained therein is not as comprehensive as compared to said 3rd party maps.

One way is to enable real-time mapping and POI discovery through the use of driver-partners and map operators on the ground. However, given the vastness of land in Southeast Asia, it is important for map-related application developer to identify and prioritize search in regions with high concentrations of POI, in order to fully utilize the limited resources available for real-time mapping.

A graph neural network can be trained based on existing country level POI locations collected, for example from the above real-time mapping and POI discovery method. This neural network can learn country specific details of how POIs are scattered across the region, in order to identify promising regions of high POI concentration for dispatching gig-workers.

Unfortunately, such an approach may not be accurate for countries with dense clusters of POIs, such as Singapore. This is due to geospatial concept drift, in which the statistical distribution of POIs vary from one region to another within a single country.

To address geospatial concept drift, one solution would be to divide our large POI graph network into multiple subgraphs and assign a single model to be trained over each subgraph.

This can be done using graph partitioning algorithms. Unfortunately, the objectives of these algorithms are to divide the graph based on present connectivity and structure and not necessarily to maximize model learning. In addition, these algorithms do not take into account the different available choices of graph models from the user, implying that certain graph models would fare much worse under the same partitioning algorithm.

There is thus a need to develop a graph partitioning and boundary refinement algorithm to address the problems above, which can be applied to all types of graphs and choice of graph neural network to better pinpoint candidate regions with good amounts of POI for on-the-ground mapping and data collection and exhibit better POI forecast results.

In the following paragraphs, various embodiments of the present disclosure which relates to a system and a method for adaptively dividing a graph network into a plurality of subnetworks.

According to the present disclosure, more than one graph neural network, each having its own set of parameters, is allocated to operate in each subnetwork. Each graph neural network is then trained and its parameters are optimized only on its allocated subnetwork using data of the nodes in the subnetwork. FIG. 1 shows various segmented regions 102, 104, 106 in a Singapore map and their boundaries determined by graph neural networks $M_1$, $M_2$, $M_3$ respectively allocated to the segmented regions 102, 104, 106 according to an embodiment of the present disclosure. The map represents a graph network and the regions are subnetworks of the graph network defined based on the goal of maximizing the collective performance of a set of graph networks ($M_1$, $M_2$, $M_3$) trained over each segment 102, 104, 106, respectively.

According to the present disclosure, a two-step process comprising a macro graph partitioning step and a cluster refinement step is utilized to improve graph boundary segmentation for a selected choice of graph neural networks. The process is applicable to generic graph based mixture of expert models where the graphs and deep learning models are arbitrary. The term mixture of experts (MoE) is used to address a machine learning framework with multiple graph neural networks, where each neural network specializes in a single data point (node), or multiple data points (nodes) within a subnetwork.

Figure 2:
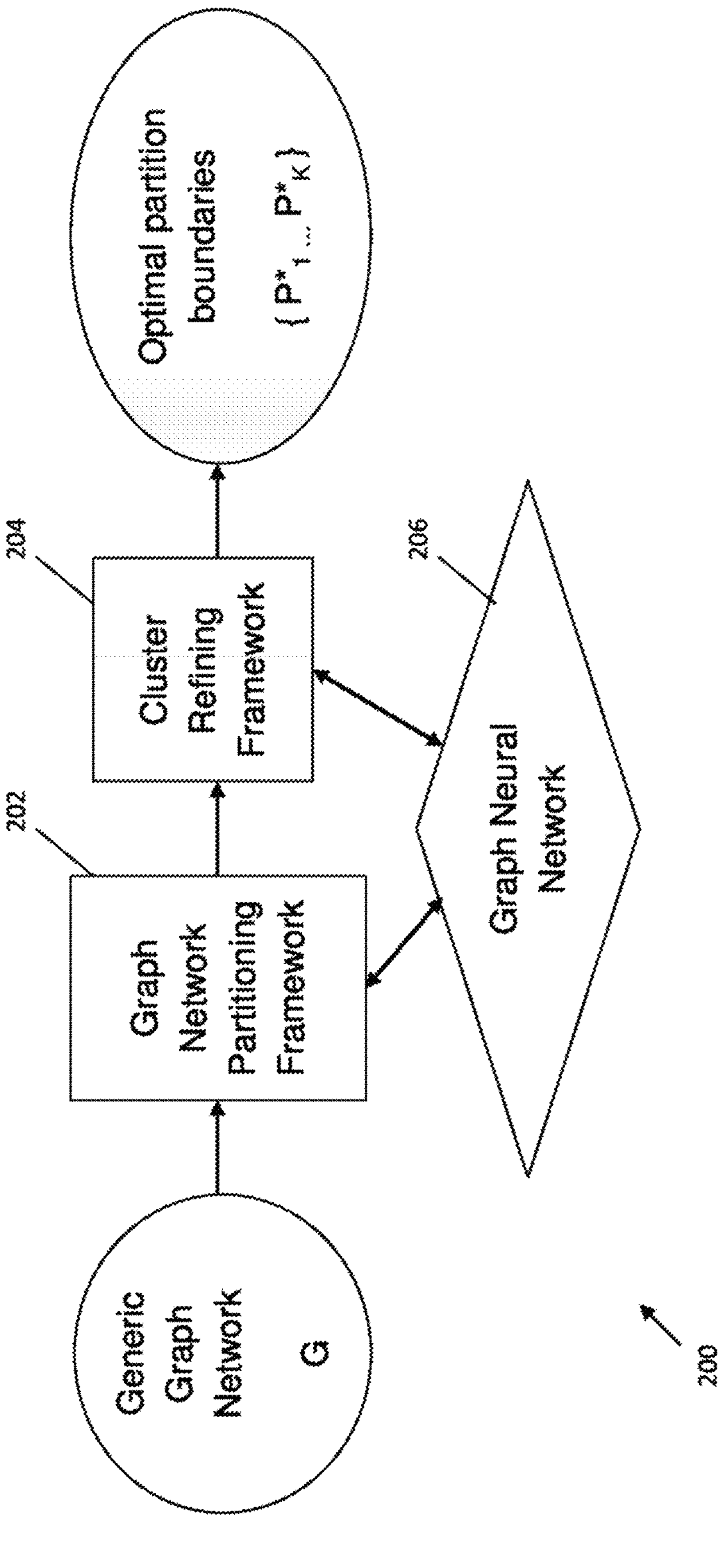
FIG. 2 shows a flow chart illustrating a two-step process for adaptively dividing a graph network and refining boundaries of subnetworks of the graph network according to an embodiment of the present disclosure.

FIG. 2 shows a flow chart 200 illustrating a two-step process for adaptively dividing a graph network and refining boundaries of subnetworks of the graph network according to an embodiment of the present disclosure. The process begins with a complete generic network graph G. In step 202, a graph network partitioning framework is performed using a selected choice of graph model by a graph neural network 206 to divide the genetic network graph G into numerous small subnetworks/partitions $\{P_1 \ldots P_N\}$, followed by an iterative subnetwork merging step (shown in FIG. 6). Each iteration of the merging step reduces the number of subgraphs by a factor of 2. After iterative merging, a set of larger subnetworks/partitions $\{P_1 \ldots P_k\}$ is obtained.

Figure 7:
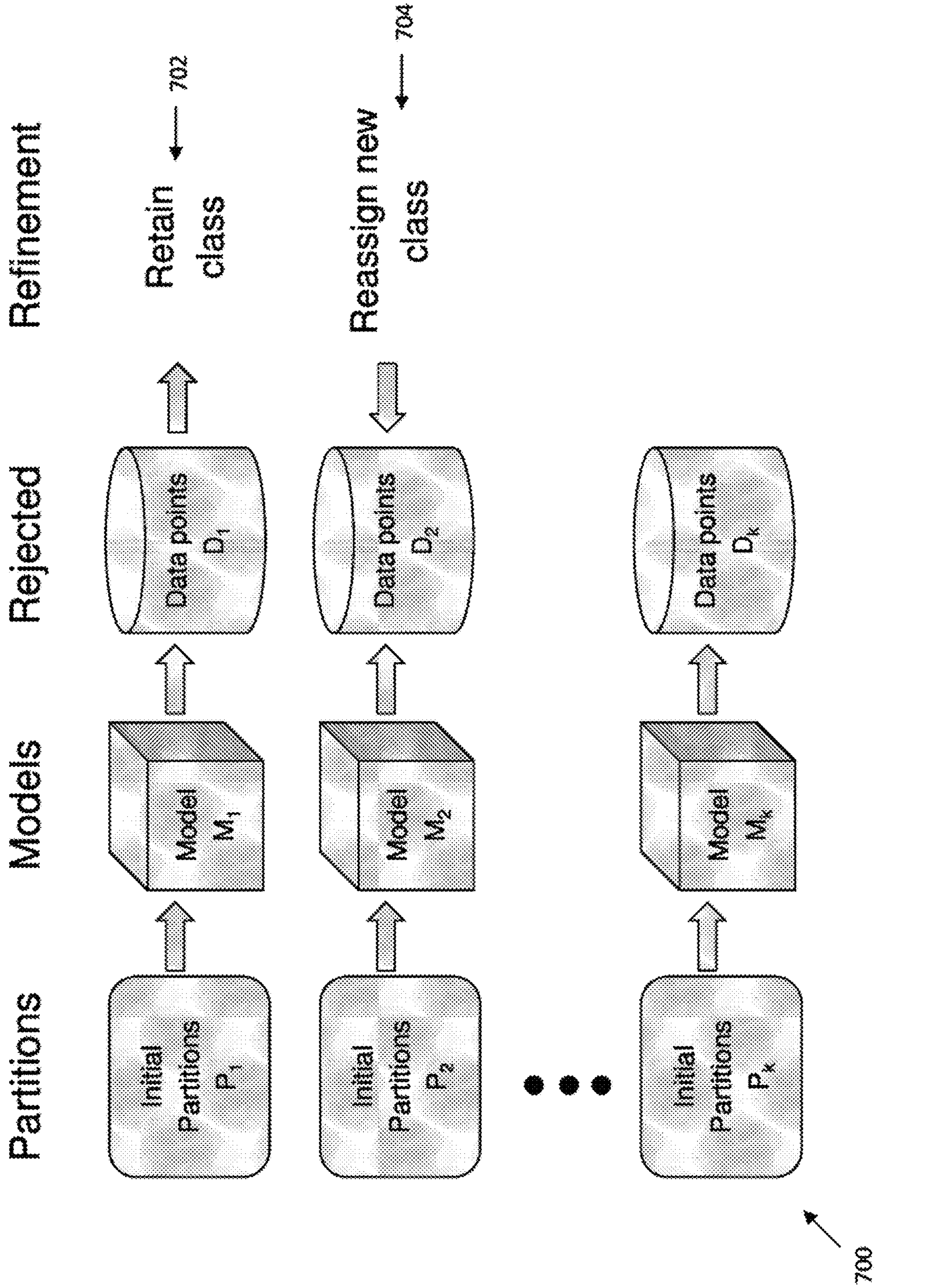
FIG. 7 shows a flow chart illustrating an example process for refining boundaries of partitions of the graph network of the two-step process of FIG. 2.

In step 204, a cluster (subnetwork) refinement framework is carried out using a selected choice of graph neural networks 206 to iteratively migrate and reassign nodes (i.e., target nodes) between the set of subnetworks/partitions $\{P_1 \ldots P_k\}$, contingent on the performance of the selected graph neural network(s) and, as a result, generate final set of subnetworks/partitions $\{P^*_1 \ldots P^*_k\}$. More details of the iterative reassignment of target nodes are shown in FIG. 7 and its accompanying description. According to the present disclosure, the processing of the generic graph network using graph neural networks will generate feedback and such feedback is then used to train and optimize the graph neural networks for further graph partitioning and cluster refining of new graph network G' (not shown).

Figure 3:
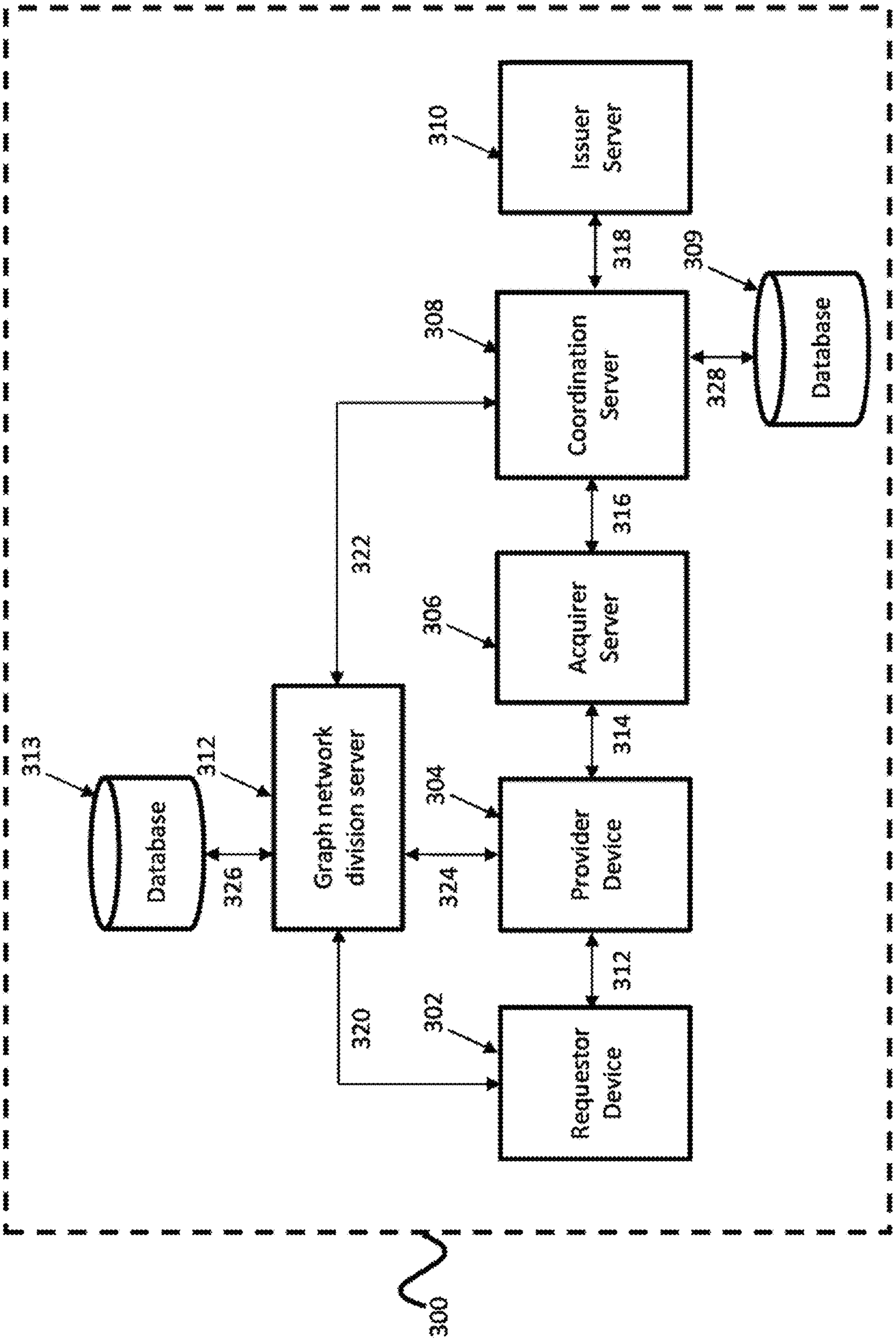
FIG. 3 shows a block diagram illustrating a system for adaptively dividing a graph network according to various embodiments of the present disclosure.

According to various embodiments of the present disclosure, the process of adaptively dividing a graph network and refining boundaries of subnetworks of the graph network can implemented through a system. FIG. 3 shows a block diagram illustrating a system 300 for adaptively dividing a graph network. Further, the system 100 may enable a transaction for a good or service, and/or a request for a good or service (e.g., graph network data or graph network division service) between a requestor and a provider/merchant (herein may referred to as “users”).

The system comprises a requestor device 302, a provider device 304, an acquirer server 306, a coordination server 308, an issuer server 310 and a graph network division server 312.

A user may be any suitable type of entity, which may include a consumer, company, corporation or governmental entity (i.e., requestor) who looking to purchase or request for a good or service (e.g., graph network data or graph network division service) via a coordination server 308, an application developer, company, corporation or governmental entity (i.e., provider/merchant) who looking to sell or provide a good or service (e.g., graph network data or graph network division service) via a coordination server 308.

A requestor device 302 is associated with a customer (or requestor) who is a party to, for example, a request for a good or service that occurs between the requestor device 302 and the provider device 304. The requestor device 302 may be a computing device such as a desktop computer, an interactive voice response (IVR) system, a smartphone, a laptop computer, a personal digital assistant computer (PDA), a mobile computer, a tablet computer, and the like.

The requestor device 302 may include user credentials (e.g., a user account) of a requestor to enable the requestor device 302 to be a party to a transaction. If the requestor has a user account, the user account may also be included (i.e., stored) in the requestor device 302. For example, a mobile device (which is a requestor device 302) may have the user account of the customer stored in the mobile device.

In one example arrangement, the requestor device 302 is a computing device in the form of a watch or similar wearable and is fitted with a wireless communications interface (e.g., a NFC interface). The requestor device 302 can then electronically communicate with the provider device 304 regarding a transaction or coordination request. The customer uses the watch or similar wearable to make a request regarding the transaction or coordination request by pressing a button on the watch or wearable.

A provider device 304 is associated with a provider who is also a party to the request for a good or service that occurs between the requestor device 302 and the provider device 304. The provider device 302 may be a computing device such as a desktop computer, an interactive voice response (IVR) system, a smartphone, a laptop computer, a personal digital assistant computer (PDA), a mobile computer, a tablet computer, and the like.

Hereinafter, the term “provider” refers to a service provider and any third party associated with providing a good or service for purchase via the provider device 304. Therefore, the user account of a provider refers to both the user account of a provider and the user account of a third party (e.g., a travel coordinator or merchant) associated with the provider.

If the provider has a user account, details of the user account may also be included (i.e., stored) in the provider device 304. For example, a mobile device (which is a provider device 304) may have user account details (e.g., account number) of the provider stored in the mobile device.

In one example arrangement, the provider device 304 is a computing device in the form of a watch or similar wearable and is fitted with a wireless communications interface (e.g., a NFC interface). The provider device 304 can then electronically communicate with the requestor to make a request regarding the transaction or travel request by pressing a button on the watch or wearable.

An acquirer server 306 is associated with an acquirer who may be an entity (e.g. a company or organization) which issues (e.g. establishes, manages, administers) a payment account (e.g. a financial bank account) of a merchant (e.g., provider). An example of an acquirer is a bank or other financial institution. As discussed above, the acquirer server 306 may include one or more computing devices that are used to establish communication with another server (e.g., the coordination server 308) by exchanging messages with and/or passing information to the other server. The acquirer server 306 forwards the payment transaction relating to a transaction or transport request to the coordination server 308.

A coordination server 108 is configured to carry out processes relating to a user account by, for example, forwarding data and information associated with the transaction to the other servers in the system 100, such as the preview server 140. In an example, the coordination server 108 may provide data and information associated with a request including location information that may be used for the preview process of preview server 140. An image may be determined based on an outcome of the preview process e.g. an image corresponding to a drop-off point for a location based on the location information, the image being one that is based on historical data identifying the drop-off point.

An issuer server 310 is associated with an issuer and may include one or more computing devices that are used to perform a payment transaction. The issuer may be an entity (e.g. a company or organization) which issues (e.g. establishes, manages, administers) a transaction credential or a payment account (e.g. a financial bank account) associated with the owner of the requestor device 302. As discussed above, the issuer server 310 may include one or more computing devices that are used to establish communication with another server (e.g., the coordination server 109308 by exchanging messages with and/or passing information to the other server.

The coordination server 308 may be a server that hosts software application programs for processing transaction or coordination requests, for example, purchasing of a good or service by a user. The coordination server 308 may also be configured for processing coordination requests between a requestor and a provider. The coordination server communicates with other servers (e.g., graph network division server 312) concerning transaction or coordination requests. The coordination server 308 may communicate with the graph network division server 312 to facilitate adaptive division and provision of a graph network associated with the transaction or coordination requests. The coordination server 308 may use a variety of different protocols and procedures in order to process the transaction or coordination requests.

In an example, the coordination server 308 may receive transaction and graph network data and information associated with a request including latent attribute, feature and information associated with nodes, subnetwork and graph network and/or their graph neural networks processing parameters from one user device (such as the requestor device 312 or the provider device 314) and provide the data and information to the graph network division server 312 for use in the adaptive graph network division/generation and subnetworks forming/reforming process.

Additionally, transactions that may be performed via the coordination server include good or service purchases, credit purchases, debit transactions, fund transfers, account withdrawals, etc. Coordination servers may be configured to process transactions via cash-substitutes, which may include payment cards, letters of credit, checks, payment accounts, tokens, etc.

The coordination server 308 is usually managed by a service provider that may be an entity (e.g. a company or organization) which operates to process transaction or coordination requests. The coordination server 308 may include one or more computing devices that are used for processing transaction or coordination requests.

A user account may be an account of a user who is registered at the coordination server 308. The user can be a customer, a service provider (e.g., a map application developer), or any third parties (e.g., a route planner) who want to use the coordination server. A user who is registered to a coordination server 308 or a graph network division server 312 will be called a registered user. A user who is not registered to the coordination server 308 or graph network division server 312 will be called a non-registered user.

The coordination server 308 may also be configured to manage the registration of users. A registered user has a user account which includes details and data of the user. The registration step is called on-boarding. A user may use either the requestor device 302 or the provider device 304 to perform on-boarding to the coordination server 308.

The on-boarding process for a user is performed by the user through one of the requestor device 302 or the provider device 304. In one arrangement, the user downloads an app (which includes, or otherwise provides access to, the API to interact with the coordination server 308) to the requestor device 302 or the provider device 304. In another arrangement, the user accesses a website (which includes, or otherwise provides access to, the API to interact with the coordination server 108) on the requestor device 302 or the provider device 304. The user is then able to interact with the graph network division server 312. The user may be a requestor or a provider associated with the requestor device 302 or the provider device 304, respectively.

Details of the registration include, for example, name of the user, address of the user, emergency contact, blood type or other healthcare information, next-of-kin contact, permissions to retrieve data and information from the requestor device 302 and/or the provider device 304. Alternatively, another mobile device may be selected instead of the requestor device 302 and/or the provider device 304 for retrieving the details/data. Once on-boarded, the user would have a user account that stores all the details/data.

It may not be necessary to have a user account at the coordination server 308 to access the functionalities of the coordination server 308. However, there may be functions that are available only to a registered user for example the provision of certain choices of advance parameters and graph neural networks for processing a graph network and certain detailed graph network data. The term user will be used to collectively refer to both registered and non-registered users. A user may interchangeably be referred to as a requestor (e.g. a person who requests for a graph network or its division service) or a provider (e.g. a person who provides the requested graph network or its division service).

The coordination server 308 may be configured to communicate with, or may include, a database 309 via connection 328. The connection 328 may be over a network (e.g., a local area network, a wide area network, the Internet, etc.). The database 328 stores user details/data as well as data corresponding to a transaction (or transaction data). Examples of the transaction data include Transaction identifier (ID), Merchant (Provider) ID, Merchant Name, MCC/Industry Code, Industry Description, Merchant Country, Merchant Address, Merchant Postal Code, Aggregate Merchant ID. For example, data ("Merchant name" or "Merchant ID") relating to the merchant/provider, time and date relating to the transaction of goods/services.

Figure 9:
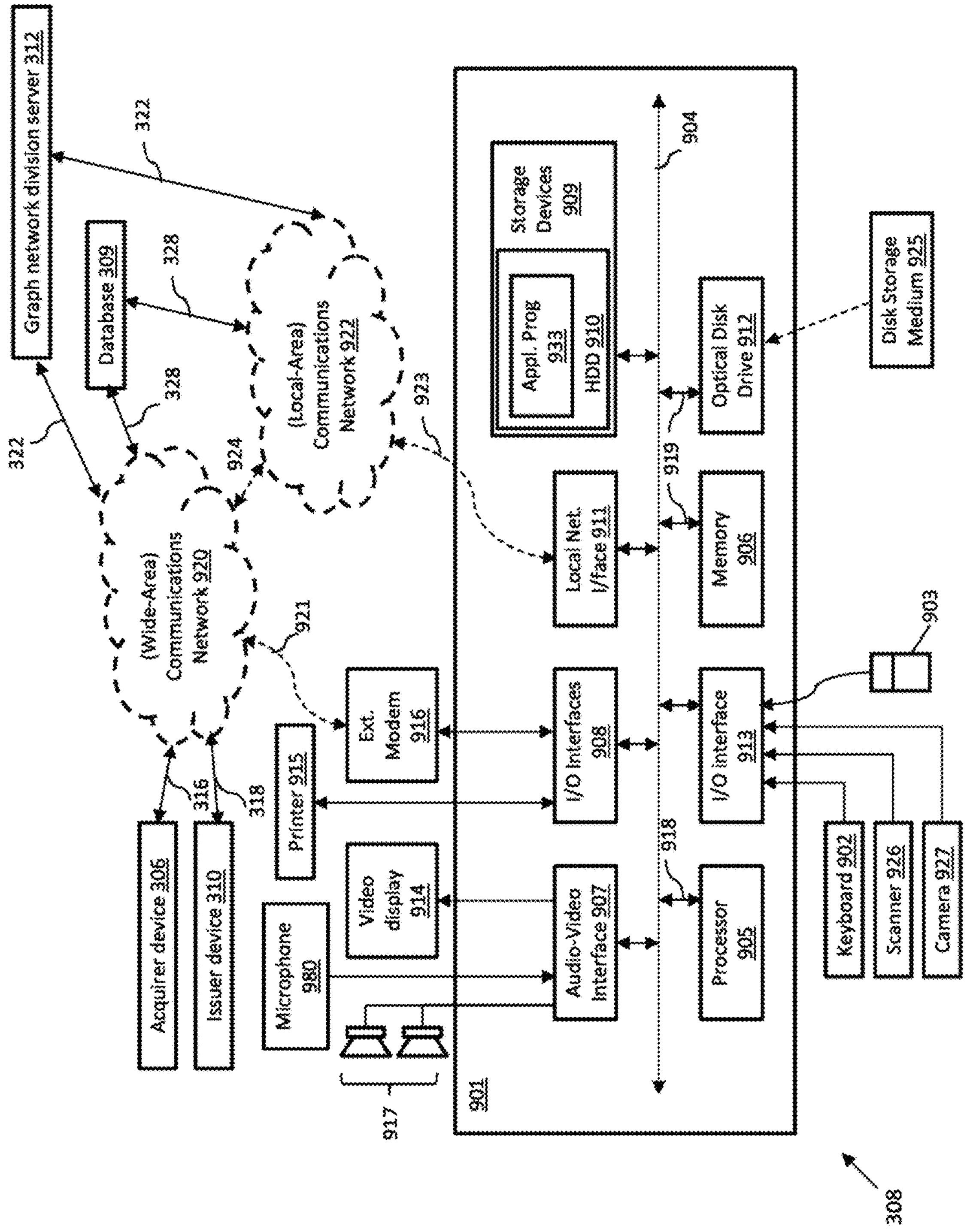
FIGS. 9 and 10 show a schematic diagram of a general purpose computer system upon which the coordination server of FIG. 3 can be practiced.
Figure 12:
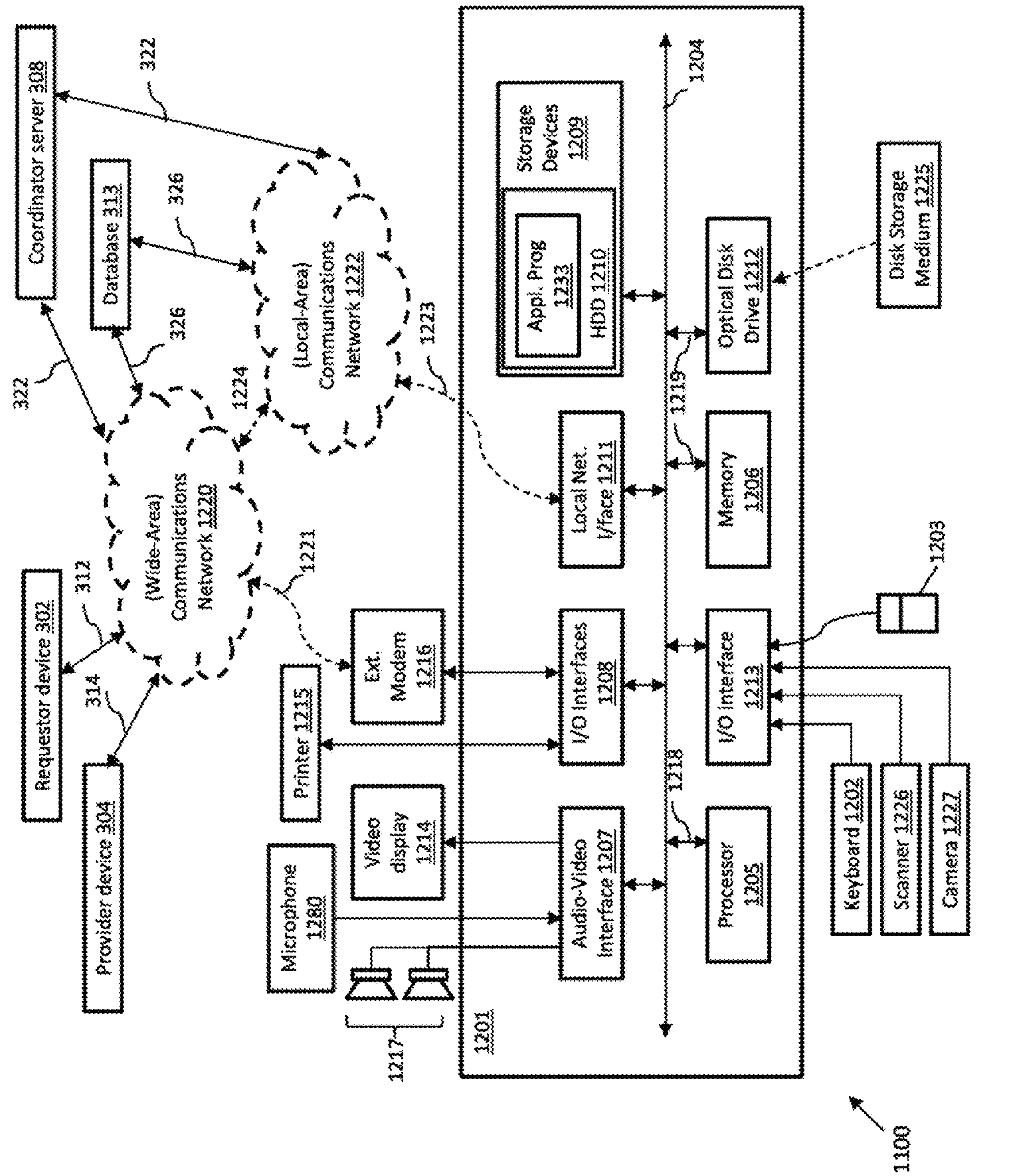
FIG. 12 shows a schematic diagram of a general purpose computer system upon which the graph network division server of FIG. 3 can be practiced.
Figure 14:
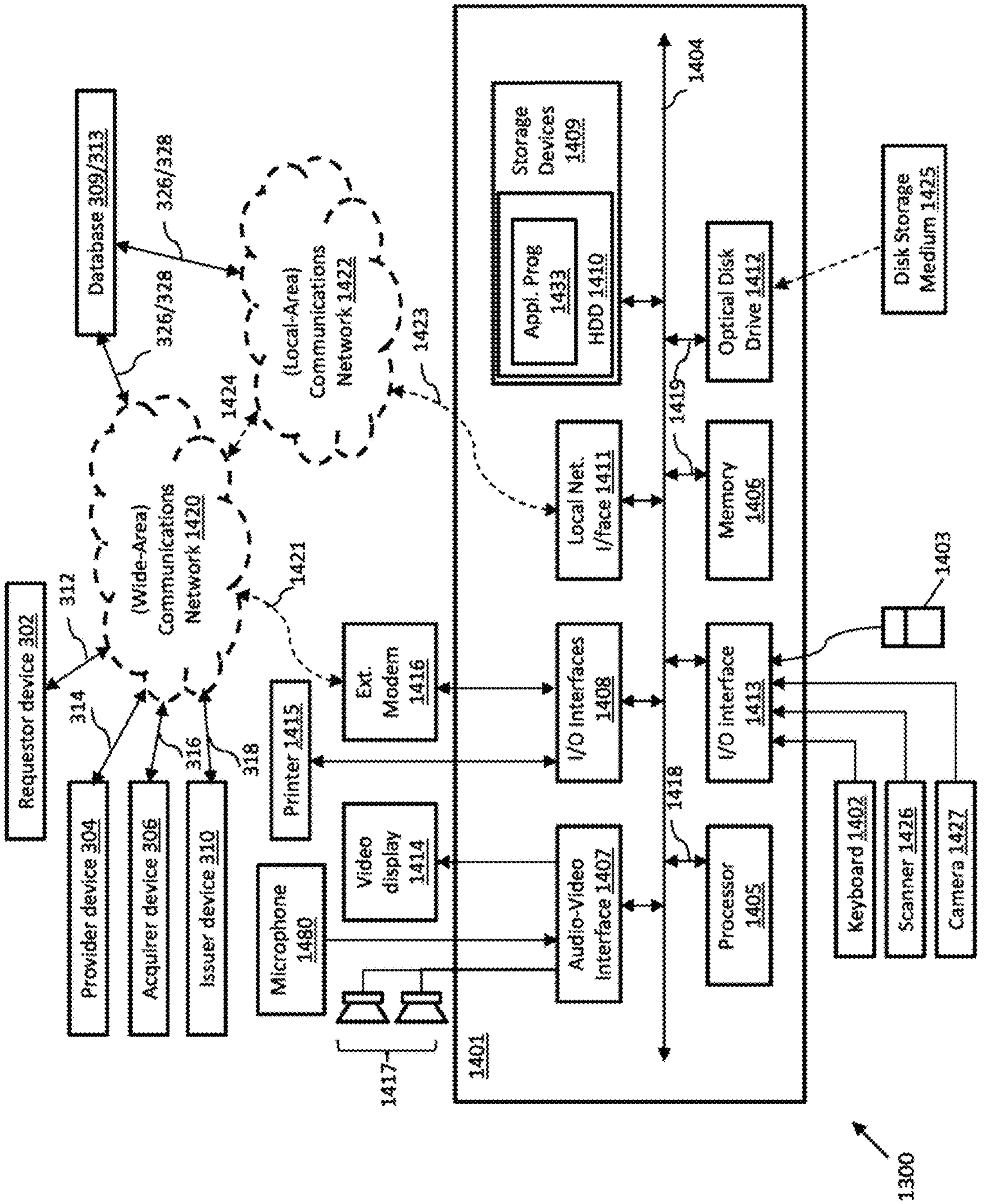
FIG. 14 shows a schematic diagram of a general purpose computer system upon which a combined coordination and graph network division server of FIG. 3 can be practiced.

A graph network division server 312 may be a server that hosts graph neural networks and software application programs for adaptively dividing a graph network into a plurality of subnetworks, the graph network comprising a plurality of nodes, each node being connected to at least one other node in the graph network. In one embodiment, each node is associated with a road within a graph/map. In one example, the graph network division server 312 may obtain data relating to a node, a subnetwork, or a graph network (e.g., latent attribute, feature and information) and/or their graph neural networks processing parameters, for example, in the form of a request, from a user device (such as the requestor device 312 or the provider device 314) or the coordination server 308, and use the data for adaptively dividing the graph network into subnetworks, forming/reforming the subnetworks and/or generating the graph network. The graph network division server may be implemented as shown in FIGS. 9, 12 and 14.

The graph network database 313 stores graph network data comprising data relating nodes such as roads across various regions of the world or part of the world like South-East-Asia (SEA). Such road data may be geo-tagged with a geographical coordinate (e.g. latitudinal and longitudinal coordinates) and map-matched to road-segments to locate a road using location coordinates. The graph network database may be a component of the graph network division server 312. In an example, the graph network database 313 may be a database managed by an external entity and the graph network database 313 is a server that, based on a request received from a user device (such as the requestor device 312 or the provider device 314) or the coordination server 308, retrieve data relating to the nodes, subnetworks and/or graph network (e.g. from the graph network database 313) and transmit the data to the user device or the coordination server 308. Alternatively, a module such as a graph network module may store the graph network instead of the graph network database 313, wherein the graph network module may be integrated as part of the graph network division server 312, or may be external to the graph network division server 312.

Use of the term 'server' herein can mean a single computing device or a plurality of interconnected computing devices which operate together to perform a particular function. That is, the server may be contained within a single hardware unit or be distributed among several or many different hardware units.

The requestor device 302 is in communication with the provider device 304 via a connection 312. The connection 312 may be an ad hoc connection (e.g., via NFC communication, Bluetooth, etc.) or over a network (e.g., the Internet). The requestor device 302 is also in communication with the graph network division server 312 via a connection 320. The connections 312, 320 may be a network connection (e.g., the Internet). The requestor device 302 may also be connected to a cloud that facilitates the system 300 for adaptively dividing and generating a graph network. For example, the requestor device 302 can send a signal or data to the cloud directly via an ad hoc connection (e.g., via NFC communication, Bluetooth, etc.) or over a network (e.g., the Internet).

The provider device 304 is in communication with the requestor device 312 as described above, usually via the coordination server 308. The provider device 304 is, in turn, in communication with the acquirer server 316 via a connection 314. The provider device 304 is also in communication with the graph network division server 312 via a connection 324. The connections 314 and 324 may be network connections (e.g., provided via the Internet). The provider device 304 may also be connected to a cloud that facilitates the system 100 for adaptively dividing and generating a graph network. For example, the provider device 304 can send a signal or data to the cloud directly via an ad hoc connection (e.g., via NFC communication, Bluetooth, etc.) or over a network (e.g., the Internet).

The acquirer server 306, in turn, is in communication with the coordination server 308 via a connection 316. The coordination server 308, in turn, is in communication with an issuer server 310 via a connection 318. The connections 316 and 318 may be over a network (e.g., the Internet).

The coordination server 308 is further in communication with the graph network division server 312 via a connection 322. The connection 322 may be over a network (e.g., a local area network, a wide area network, the Internet, etc.). In one arrangement, the coordination server 308 and the graph network division server 312 are combined and the connection 322 may be an interconnected bus.

The graph network division server 312, in turn, is in communication with a graph network database 313 via a connection 326. The connection 326 may be a network connection (e.g., provided via the Internet). The graph network division server 312 may also be connected to a cloud that facilitates the system 300 for adaptively dividing the graph network into subnetworks, forming/reforming the subnetworks and/or generating the graph network. For example, the graph network division server 312 can send a signal or data to the cloud directly via a wireless ad hoc connection (e.g., via NFC communication, Bluetooth, etc.) or over a network (e.g., the Internet).

In the illustrative embodiment, each of the devices 302, 304, and the servers 306, 308, 310, 312 provides an interface to enable communication with other connected devices 302, 304 and/or servers 306, 308, 310, 312. Such communication is facilitated by an application programming interface ("API"). Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. Examples of APIs include the REST API, and the like. For example, it is possible for at least one of the requestor device 302 and the provider device 304 to receive or submit a request to generate or dividing a graph network and/or forming/reforming subnetworks of a graph network in response to an enquiry shown on the GUI running on the respective API.

Figure 4:
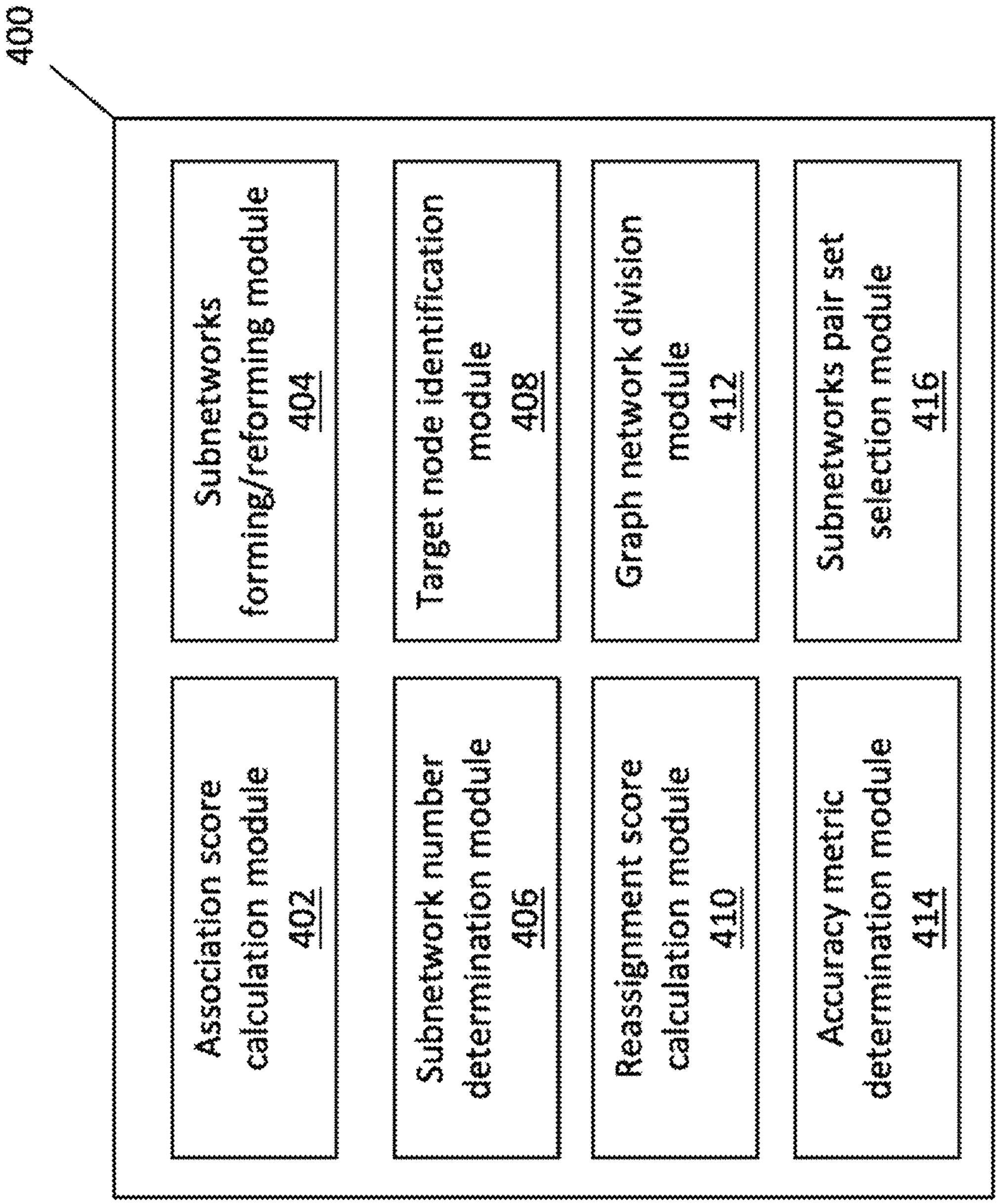
FIG. 4 shows a block diagram illustrating various components of a system for adaptively dividing a graph network according to an embodiment of the present disclosure.

FIG. 4 shows a block diagram illustrating various components of a system 400 for adaptively dividing a graph network according to an embodiment of the present disclosure. The system 400 may comprise a graph division module 412 to divide the graph network into a plurality of subnetworks, for example into multiple partitions of equal size (equal number of nodes), using generic partitioning frameworks. The system 400 may also comprise a graph model initiation module (not shown) to allocate graph neural network models, each having a set of parameters (denoted as M), to each subnetwork, and train each of the graph neural networks models and optimize its set of parameters only on its allocated partition using data of the nodes in the subnetwork.

The system 400 comprises an association score calculation module 402 configured to calculate an association score S, for each subnetwork pair (e.g., subnetworks A and B) of the plurality of subnetworks within a graph network, based on a first accuracy metric $$\left(\text{e.g., } P_{M_B}^{node_A}\right)$$

in predicting a latent attribute of at least one first node (e.g., $node_A$) of a first subnetwork (e.g., subnetwork A) of the subnetwork pair using parameters (e.g., $M_B$) optimized for accurately predicting a second latent attribute of at least one second node (e.g., $node_B$) of a second subnetwork (e.g., subnetwork B) of the subnetwork pair. Additionally or alternatively, an association score, for each subnetwork pair (e.g., subnetworks A and B) of the plurality of subnetworks within a graph network, is calculated based on a second accuracy metric $$\left(\text{e.g., } P_{M_A}^{node_B}\right)$$

in in predicting of the second latent attribute of the at least one second node of the second subnetwork of the subnetwork pair (e.g., subnetwork B) using parameters (e.g., $M_A$) optimized for accurately predicting the first latent attribute of the at least one first node of the first subnetwork of the subnetwork pair (e.g., subnetwork A).

The system 400 may comprise a subnetwork pair set generation module (not shown) configured to generate all subnetwork pair combinations (pair sets) of the graph network, each pair combination having a different set of subnetwork pairs.

The system 400 further comprises a subnetwork forming/reforming module 404 configured to form one of a plurality of larger subnetworks (e.g., subnetwork A') within the graph network from each pair of a pair combination from all the pair combinations based on a result of determining a sum of the association scores of the pair combination is higher than that of another pair combination. In one embodiment, the subnetwork forming/reforming module 404 form a larger subnetwork (e.g., subnetwork A') from a subnetwork pair (e.g., subnetworks A and B) by identifying or classifying every node in the subnetwork pair a node of the larger subnetwork.

In one embodiment, the association score calculation module 402 of the system 400 may be further configured to calculate a sum of the association scores of all pairs within each of the subnetwork pair combinations, and a subnetworks pair set selection module 416 to select a pair combination among all the subnetwork pair combinations with the highest association score sum. The subnetwork forming/reforming module 404 is configured to then form the plurality of larger subnetworks (e.g., subnetwork A') within the graph network from the pair combination selected by the subnetworks pair set selection module 416.

In another embodiment, the system 400 may further comprise an accuracy metric determination module 414 configured to determine if the first accuracy metric and/or the second accuracy metric is higher than a threshold accuracy metric, where the threshold accuracy metric is one of a third accuracy metric $$\left(\text{e.g., } P_{M_A}^{node_A}\right)$$

in predicting the first latent attribute of the at least one first node (e.g., $node_A$) of the first subnetwork (e.g., subnetwork A) of the subnetwork pair using the parameters optimized for accurately predicting the first latent attribute of the at least one first node of the first subnetwork and the second accuracy metric is higher than a fourth accuracy metric $$\left(\text{e.g., } P_{M_B}^{node_B}\right)$$

in predicting the second latent attribute of the at least one second node (e.g., $node_B$) of the second subnetwork (e.g., subnetwork B) of the subnetwork pair using the parameters optimized for accurately predicting the second latent attribute of the at least one second node of the second subnetwork. The subnetwork forming/reforming module 404 is configured to then form a larger subnetwork (e.g., subnetwork A') from the subnetwork pair if it is determined that the first accuracy metric and/or the second accuracy metric is higher than the threshold accuracy metric.

In another embodiment, if a previous merging process and formation of a subnetwork from a subnetwork pair has been carried out, a subnetwork number determination module 406 in the system 400 may be configured to determine if the number of subnetworks within the map is higher than a pre-configured threshold number of subnetworks. In response to determining that the number of subnetworks within the map is higher than a pre-configured threshold number of subnetworks the association score calculation module 402 further calculates the association score for each subnetworks pair in the graph network and/or the subnetwork forming/reforming module carries out the formation of the plurality of larger subnetworks in response to determining of the number of subnetworks being higher than the pre-configured threshold number of subnetworks.

In an additional or alternative embodiment, the system 400 comprises a target node identification module 408 configured to identify a target node (e.g., node t) in a target subnetwork (e.g., subnetwork A' or one of the plurality of larger subnetworks formed by subnetworks forming/reforming module) in the graph network based on a fifth accuracy metric $$\left(\text{e.g., } P_{M_{A'}}^{node\_t}\right)$$

in predicting a latent attribute of the target node to be in the target subnetwork using parameters optimized for accurately predicting each of nodes of the target subnetwork to be in the target subnetwork.

The system 400 comprises a reassignment score calculation module 410 configured to calculate a reassignment score for another subnetwork (e.g., subnetworks B') based on a sixth accuracy metric $$\left(\text{e.g., } P_{M_{B'}}^{node\_t}\right)$$

in predicting the latent attribute of the target node using parameters optimized for the other subnetwork (e.g., $M_{B'}$). The reassignment score calculation module 410 is configured to calculate a reassignment score for every other subnetwork (e.g., subnetworks B', C' . . . ) in the graph network, apart from the target subnetwork whether the target node currently belongs.

The subnetworks forming/reforming module 404 is further configured to remove the target node from the target subnetwork and identify/classify the target node as a node of the subnetwork that has a highest reassignment score along all calculated reassignment scores calculated by the reassignment score calculation module 410, and as a result, reform the target subnetwork and the subnetwork with the highest assignment score.

In one embodiment, the accuracy metric determination module 414 may be further configured to determine if the sixth accuracy metric $$\left(\text{e.g., } P^{node\_t}_{M_{B'}}\right)$$

of the other subnetwork (e.g., subnetwork B') associated with the highest reassignment score is higher than the fifth accuracy metric $$\left(\text{e.g., } P^{node\_t}_{M_{A'}}\right)$$

the target subnetwork (e.g., subnetwork A') in predicting the latent attribute of the target node. The subnetwork forming/reforming module 404 is configured to then reassign the target node from the target subnetwork (e.g., subnetwork A') to the other subnetwork (e.g., subnetwork B'), i.e., remove the target node from the target subnetwork and identify the other subnetwork to further comprise the target node, to reform the target subnetwork and the other subnetwork if it is determined that the sixth accuracy metric is at least higher than the fifth accuracy metric.

Figure 5:
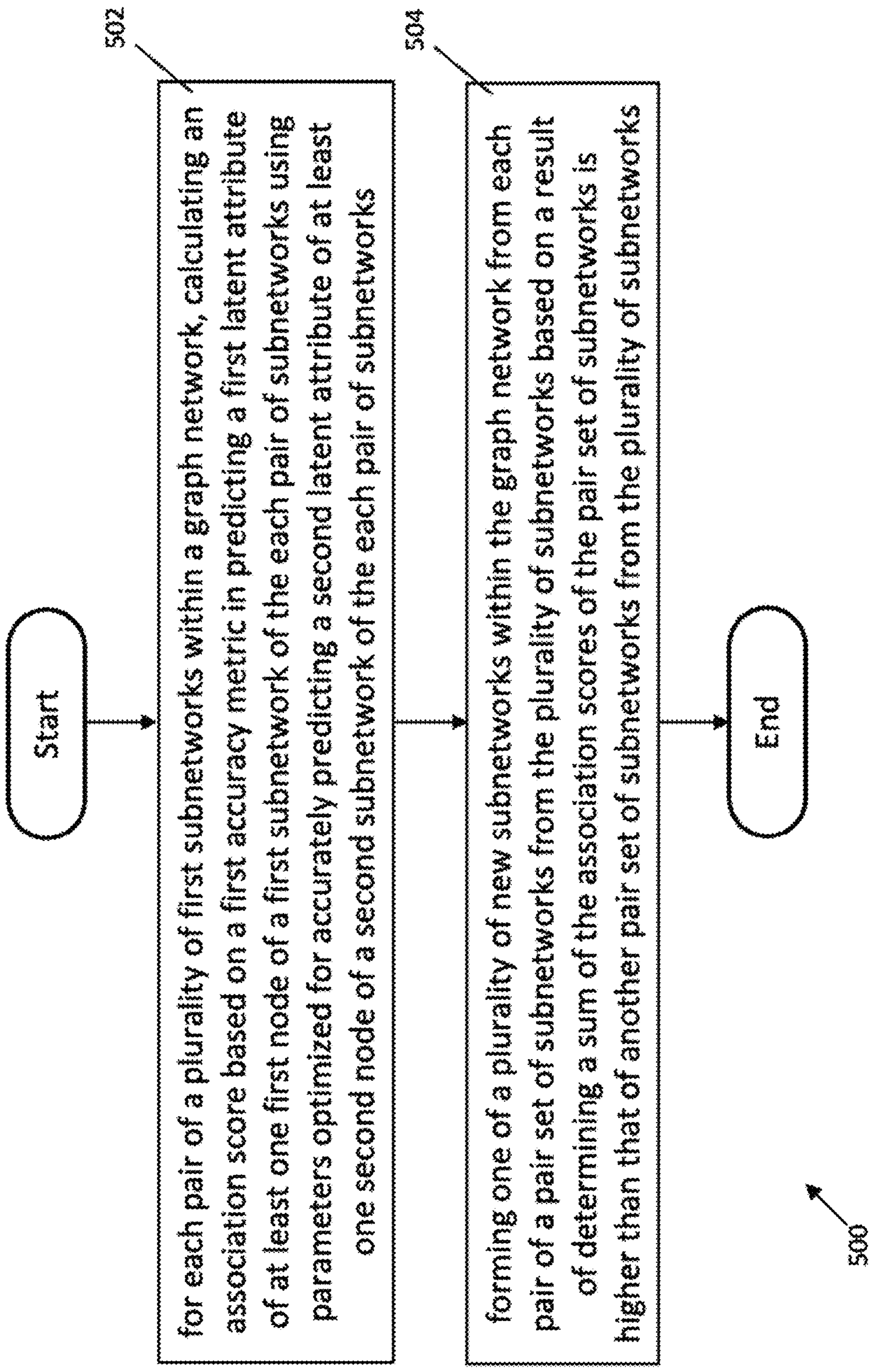
FIG. 5 shows a flow chart illustrating a method for adaptively dividing a graph network according to an embodiment of the present disclosure.

FIG. 5 shows a flow chart 500 illustrating a method for adaptively dividing a graph network according to an embodiment of the present disclosure. In step 502, a step of calculating, for each pair of subnetworks from a plurality of subnetworks within a graph network, an association score is carried out based on a first accuracy metric in predicting a first latent attribute of at least one first node of a first subnetwork of the each pair of subnetworks using parameters optimized for accurately predicting at least one second node of a second subnetwork of the each pair of the subnetworks. In step 504, a step of forming one of a plurality of new subnetworks within the graph network from each pair of a pair set of subnetworks from the plurality of subnetworks is carried out based on a result of determining a sum of the association scores of the pair set of the plurality of first subnetworks is higher than that of another pair set subnetworks from the plurality of first subnetworks.

The method for adaptively dividing a graph network may further comprises a step of identifying a third (target) node in a target subnetwork of the plurality of subnetworks based on a highest third accuracy metric in predicting a third latent attribute of the third node using parameters optimized for accurately predicting the third latent attribute of the third node. Next, for each of the remaining subnetworks of the plurality of the subnetworks, a step of calculating a reassignment score to assign the third node to the each of the remaining subnetworks is further carried out based on a fourth accuracy metric in predicting the third latent attribute of the third node using parameters optimized for accurately predicting a fourth attribute of at least one fourth node of the each of the remaining subnetworks. Subsequently, a step of reforming the target subnetwork and one of the remaining subnetworks with a highest reassignment score from the calculated reassignment scores is carried out by removing the third node from the target subnetwork and identifying the one of the remaining subnetworks with the highest reassignment score to further comprise the third node.

Figure 6:
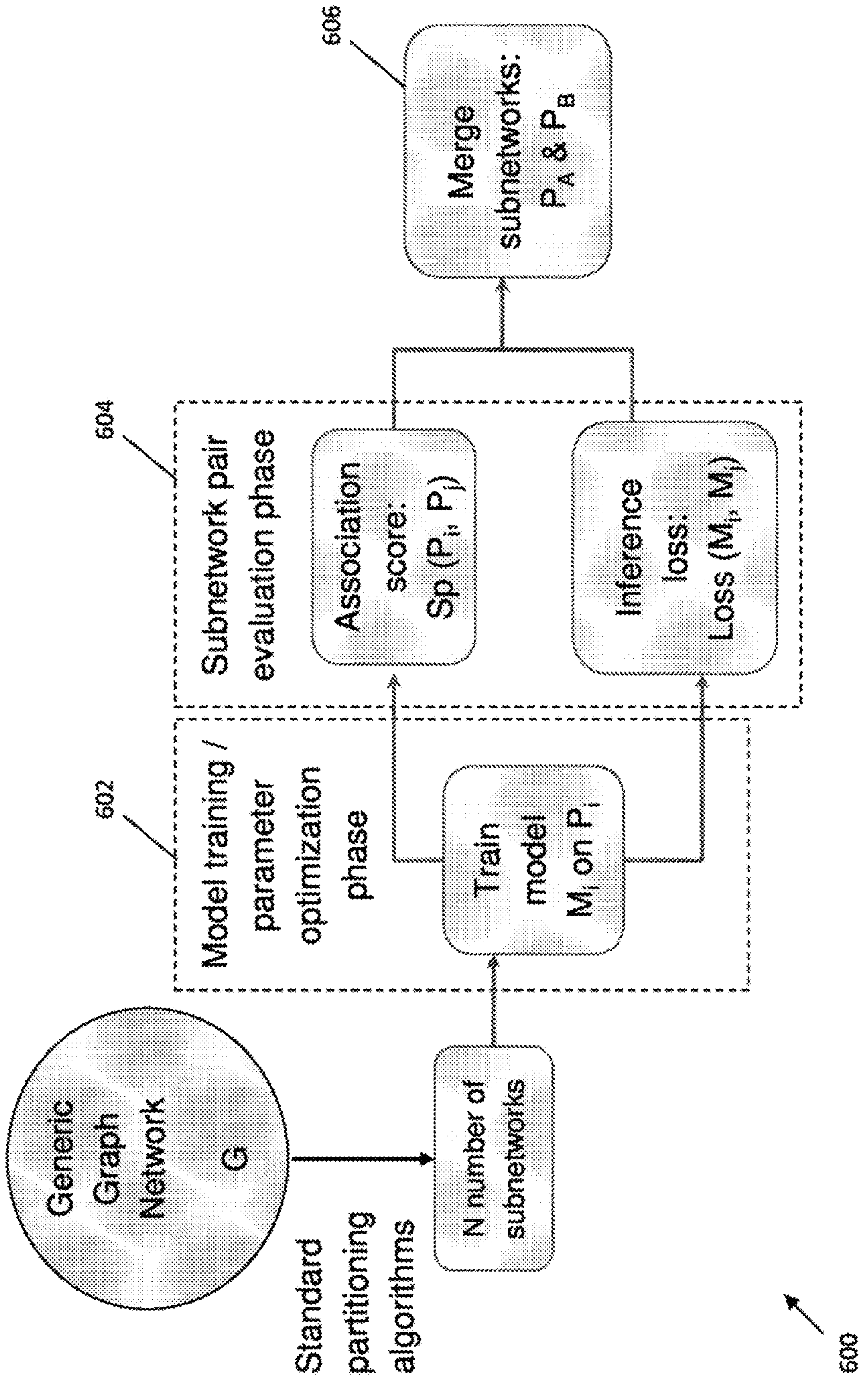
FIG. 6 shows a flow chart illustrating an example process for adaptively dividing a graph network of the two-step process of FIG. 2.

FIG. 6 shows a flow chart 600 illustrating an example process for adaptively dividing a graph network of the two-step process of FIG. 2. A full network graph G is first divided into multiple clusters N using partitioning frameworks, such as [1, 2, 3]. In model training/parameter optimization step 602, graph neural network (GCNN) models are allocated for each N partition, and a set of parameters of each of GCNN model is trained on its allocated partition using data of nodes of the partition.

In subnetwork pair evaluation step 604, cluster association score $S_{Merge}(M_I, M_J)$ which is a score of combining two models $M_I$ and $M_J$ trained over two partitions $P_I$ & $P_J$ is calculated for every partition pair in the graph network G using Equations 1 and 2, where Sp $(P_i, P_J)$ represents an arbitrary cluster distancing score which penalizes the selection of cluster pairs with low degree of connectedness; and Loss(Mi, $M_J$) represents the inference loss of model $M_I$ on partition $P_J$ and model $M_J$ on partition $P_I$ . . . For example, the spinner connectivity score for measuring the degree of connectedness between partition can be used to determine association score.

$$S_{Merge}(M_I, M_J) = \alpha Sp(P_I, P_J) - \beta \text{Loss}(M_I, M_J) \quad \text{Equation (1)}$$

where $\alpha, \beta$ are constants $$\text{Loss}(M_I, M_J) = \frac{\text{Loss}(P_J \mid M_I) + \text{Loss}(P_I \mid M_J)}{2} \quad \text{Equation (2)}$$

In the graph matching problem to obtain an optimal partition pair set $P^*=\{(P_1, P_2) \ldots (P_A, P_B)\}$ such that a sum of the association score of all pairs in the pair set, i.e., $\Sigma_{(I,J)\in S^*} S(M_I, M_J)$, is the highest/maximum among those of other pair sets. In step 606, each partition pair of the optimal partition pair set is merged to form a new partition set $P^*=\{P^*_1 \ldots P^*_K\}$ and as a result, the number of partitions in the graph network is deduced by a factor of 2, i.e., N/2. The steps 602, 604, 606 are repeated until a desired number of partitions is obtained.

FIG. 7 shows a flow chart 700 illustrating an example process for refining boundaries of partitions of the graph network of the two-step process of FIG. 2. A set of worst performing nodes $D_{MI}$ (i.e., target nodes) within a partition $P_I$ on a model $M_J$ is identified based on an inference loss using Equation 3. In particular, a graph consists of a plurality of vertices V connected by links or edges, and a set of parameters of a graph neural network ($M_I$) is optimized over a given partition ($P_I$) within the graph. For each vertex ($V_I$) in the partition ($P_I$), the vertex $V_I$ is run through the graph neural network optimized over the partition ($P_I$) to obtain a labelled score and this labelled score is then compared to the true label or known label (e.g., known latent attribute) to calculate the interference loss (or accuracy metric). N number of vertices with the worst performance (e.g., highest interference loss or lowest accuracy metric) is then picked out to form the set of worst performing nodes $D_{MI}$ (i.e., target nodes) of the partition $P_I$.

$$D_{MI} = \text{argmax}_{\{V_1 \ldots V_M\}} \sum_{M \in P_I} \text{Loss}(V_M \mid M_I) \quad \text{Equation (3)}$$

$$S_{Reassign}(M_I, D_{MI}) = \alpha Sp(P_I, D_{MI}) - \beta \text{Loss}(D_{MI} \mid M_I) \quad \text{Equation (4)}$$

where $\alpha, \beta$ are constants

Subsequently, a reassignment score $S_{reassign}(M_J, D_{MI})$ of assigning D from partition $P_i$ to another partition $P_J$ (with associated model $M_J$), is calculated using equation (4), where Sp $(P_J, D_{MI})$ represents an arbitrary cluster distancing score which penalizes the selection of partition pairs with low degree of connectedness and Loss $(M_J, D_{MI})$ represents the inference loss of model $M_J$ on the batch of vertices $D_{MI}$. Such reassignment score is calculated for every other partition within an existing partition set, e.g., partition set e.g., $P^*=\{P^*_1 \ldots P^*_K\}$ obtained from graph partitioning framework, Intuitively, the best performing partition is selected based on the highest reassignment score among the reassignment scores of all choices of partitions within the partition set and $D_{MI}$ is then allocated to the best performing partition, as illustrated in the cluster refining process of partitions $P_2$ at 704.

In one embodiment, a set of worst performing nodes within each partition of the partition set e.g., $P^*=\{P^*_1 \ldots P^*_K\}$ is identified, and the cluster refining process is repeated on each partition until an optimal partition boundary in the graph network is obtained.

Figure 8:
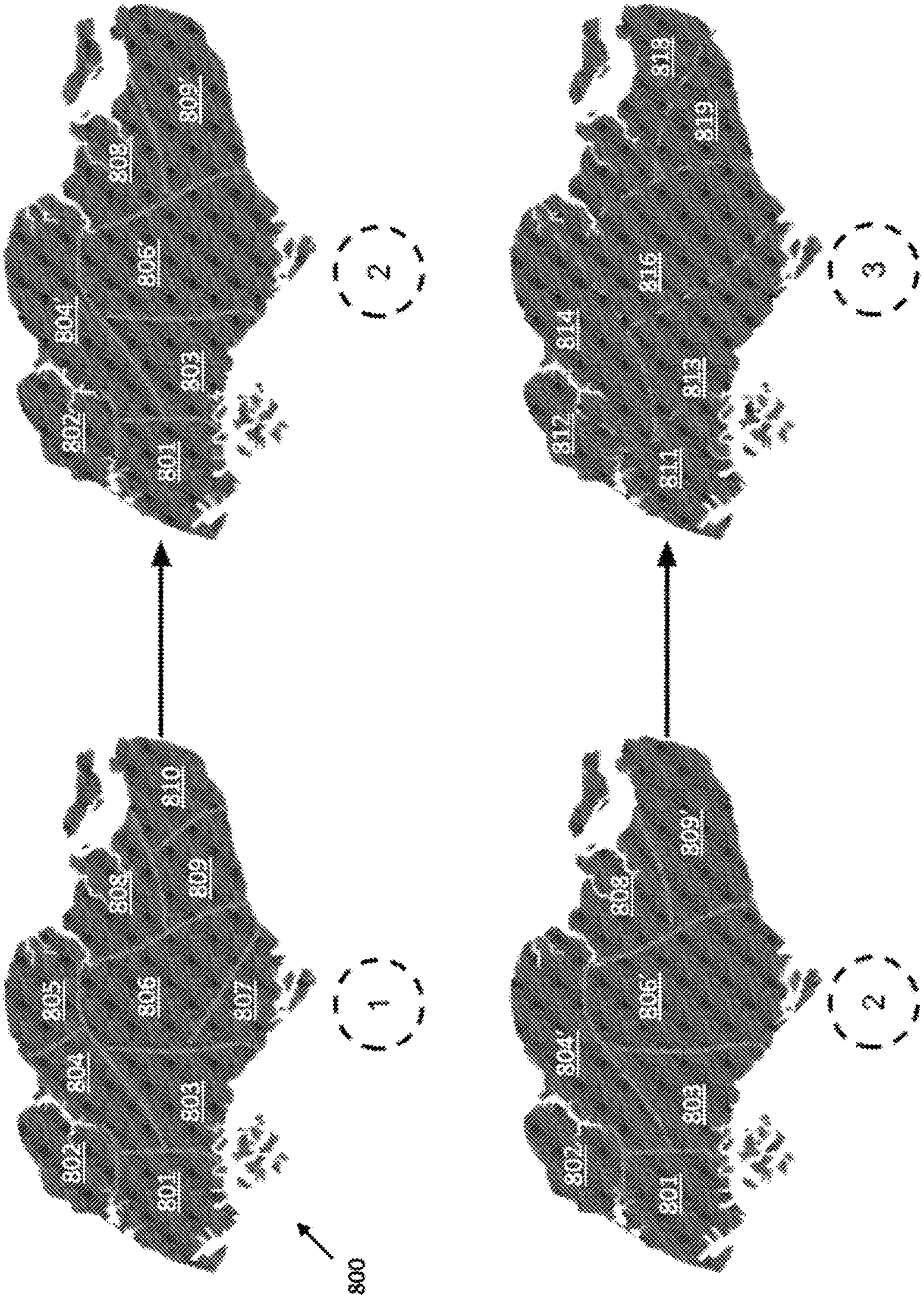
FIG. 8 shows a schematic diagram illustrating various segmented regions 801-810 in a Singapore map 800 and their boundaries merged and refined by graph neural networks respectively allocated to the segmented regions 801-810 according to an embodiment of the present disclosure.

FIG. 8 shows a schematic diagram illustrating various segmented regions 801-810 in a Singapore map 800 and their boundaries merged and refined by graph neural networks respectively allocated to the segmented regions 801-810 according to an embodiment of the present disclosure. The Singapore map 800 comprises a plurality of roads (nodes). In the phase, the Singapore map 800 may be divided into multiple small regions 801-810 using standard partitioning algorithms, each region comprising a plurality of nodes. In this example, 10 regions 801-810 Graph neural network (GCNN) models are allocated for each region 810-811, and a set of parameters of each of GCNN model is trained on its allocated region 810-811 using data of nodes of the region 810-811. Two regions may be merged based on the accuracy metric of each of the two regions in predicting a latent attribute of a node in their own region and their association scores and form a larger region. In this embodiment, the merging step three pairs of regions (e.g., regions 804 and 805, regions 806 and 807, and regions 809, 810) to form three larger regions (e.g., regions 804', 806', 809' respectively) and reduce the number of regions in the map from 10 to 7 regions.

Subsequently, boundary refinements are carried out by moving small batches of D_mi vertices (or worst performing vertices in each region) across subnetwork boundaries based on accuracy metric of the vertices in their own region and accuracy metric and/or reassignment score of the vertices in another region in the map 800, This will cause then cause the subnetwork boundaries to change after reassigning D_mi vertices to other subnetworks. In this embodiment, as shown in FIG. 8, some vertices are reassigned from region 804' to region 802, from region 801 to region 803, from region 803 and region 806' to region 804', from region 809 to region 808 and from region 806' to region 808 and region 809', there by shifting the boundaries of therebetween and form regions 811, 812, 813, 814, 816, 818, 819 with refined boundaries.

FIG. 9 shows a schematic diagram of a general purpose computer system 900 upon which the coordination server 308 of FIG. 3 can be practiced. The computer system 900 includes: a computer module 901, input devices such as a keyboard 902, a mouse pointer device 903, a scanner 926, a camera 927, and a microphone 980; and output devices including a printer 915, a display device 914 and loudspeakers 917. An external Modulator-Demodulator (Modem) transceiver device 916 may be used by the computer module 901 for communicating to and from a communications network 920 via a connection 921. The communications network 920 may be a wide-area network (WAN), such as the Internet, a cellular telecommunications network, or a private WAN. Where the connection 921 is a telephone line, the modem 916 may be a traditional “dial-up” modem. Alternatively, where the connection 921 is a high capacity (e.g., cable) connection, the modem 916 may be a broadband modem. A wireless modem may also be used for wireless connection to the communications network 920.

The input and output devices may be used by an operator who is interacting with the coordination server 308. For example, the printer 915 may be used to print reports relating to the status of the coordination server 308.

The coordination server 308 uses the communications network 920 to communicate with the provider device 304, the requestor device 302, the graph network division server 312 and the database 328 to receive commands and data. The coordination server 308 also uses the communications network 920 to communicate with the provider device 304, the requestor device 302, the graph network division server 312 and the database 328 to send notification messages or transaction and graph network data.

The computer module 901 typically includes at least one processor unit 905, and at least one memory unit 906. For example, the memory unit 906 may have semiconductor random access memory (RAM) and semiconductor read only memory (ROM). The computer module 901 also includes a number of input/output (I/O) interfaces including: an audio-video interface 907 that couples to the video display 914, loudspeakers 917 and microphone 980; an I/O interface 913 that couples to the keyboard 902, mouse 903, scanner 926, camera 927 and optionally a joystick or other human interface device (not illustrated); and an interface 908 for the external modem 916 and printer 915. In some implementations, the modem 916 may be incorporated within the computer module 901, for example within the interface 908. The computer module 901 also has a local network interface 911, which permits coupling of the computer system 900 via a connection 223 to a local-area communications network 922, known as a Local Area Network (LAN). As illustrated in FIG. 9, the local communications network 922 may also couple to the wide network 920 via a connection 924, which would typically include a so-called “firewall” device or device of similar functionality. The local network interface 911 may comprise an Ethernet circuit card, a Bluetooth© wireless arrangement or an IEEE 902.11 wireless arrangement; however, numerous other types of interfaces may be practiced for the interface 911.

The I/O interfaces 908 and 913 may afford either or both of serial and parallel connectivity, the former typically being implemented according to the Universal Serial Bus (USB) standards and having corresponding USB connectors (not illustrated). Storage devices 909 are provided and typically include a hard disk drive (HDD) 910. Other storage devices such as a floppy disk drive and a magnetic tape drive (not illustrated) may also be used. An optical disk drive 912 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the coordination server 308.

The components 905 to 913 of the computer module 901 typically communicate via an interconnected bus 904 and in a manner that results in a conventional mode of operation of a computer system known to those in the relevant art. For example, the processor 905 is coupled to the system bus 904 using a connection 918. Likewise, the memory 906 and optical disk drive 912 are coupled to the system bus 904 by connections 919. Examples of computers on which the described arrangements can be practised include IBM-PC’s and compatibles, Sun Sparcstations, Apple Mac™ or like computer systems.

The methods of operating the coordination server 308, as shown in the processes of FIGS. 2 and 5-7, may be implemented as one or more software application programs 933 executable within the coordination server 308. In particular, the steps of the processes shown in FIGS. 2 and 5-7 are effected by instructions 931 (see FIG. 10) in the software (i.e., computer program codes) 933 that are carried out within the coordination server 308. The software instructions 931 may be formed as one or more code modules, each for performing one or more particular tasks. The software may also be divided into two separate parts, in which a first part and the corresponding code modules performs the operation of the coordination server 308 and a second part and the corresponding code modules manages the API and corresponding user interfaces in the provider device 304, the requestor device 302, and on the display 914. In other words, the second part of the software manages the interaction between (a) the first part and (b) any one of the provider device 304, the requestor device 302, and the operator of the server 308.

The software may be stored in a computer readable medium, including the storage devices described below, for example. The software is loaded into the coordination server 308 from the computer readable medium, and then executed by the computer system 900. A computer readable medium having such software or computer program recorded on the computer readable medium is a computer program product. The use of the computer program product in the coordination server 308 preferably effects an advantageous apparatus for receiving/transmitting transaction data and/or graph network data including latent attributes associated with nodes, subnetwork and graph network and/or their graph neural networks processing parameters used for adaptively dividing a graph network into subnetworks and refining/reforming the subnetworks.

The software (i.e., computer program codes) 933 is typically stored in the HDD 910 or the memory 906. The software 933 is loaded into the computer system 900 from a computer readable medium (e.g., the memory 906), and executed by the processor 905. Thus, for example, the software 933 may be stored on an optically readable disk storage medium (e.g., CD-ROM) 925 that is read by the optical disk drive 912. A computer readable medium having such software or computer program recorded on it is a computer program product. The use of the computer program product in the coordination server 308 preferably effects an apparatus for receiving/transmitting transaction data and/or graph network data including latent attributes associated with nodes, subnetwork and graph network and/or their graph neural networks processing parameters used for adaptively dividing a graph network into subnetworks and refining/reforming the subnetworks.

In some instances, the application programs 933 may be supplied to the user encoded on one or more CD-ROMs 925 and read via the corresponding drive 912, or alternatively may be read by the user from the networks 920 or 922. Still further, the software can also be loaded into the coordination server 308 from other computer readable media. Computer readable storage media refers to any non-transitory tangible storage medium that provides recorded instructions and/or data to the coordination server 308 for execution and/or processing by the processor 905. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 901. Examples of transitory or non-tangible computer readable transmission media that may also participate in the provision of software, application programs, instructions and/or data to the computer module 901 include radio or infra-red transmission channels as well as a network connection to another computer or networked device, and the Internet or Intranets including e-mail transmissions and information recorded on Websites and the like.

The second part of the application programs 933 and the corresponding code modules mentioned above may be executed to implement one or more API of the coordination server 308 with associated graphical user interfaces (GUIs) to be rendered or otherwise represented upon the display 914 or the display of the provider device 304 and the requestor device 302. Through manipulation of typically the keyboard 902 and the mouse 903, an operator of the server 110 and the application may manipulate the interface in a functionally adaptable manner to provide controlling commands and/or input to the applications associated with the GUI(s). Similarly, on the provider device 304 and the requestor device 302, a user of those devices 302, 304 manipulate the input devices (e.g., touch screen, keyboard, mouse, etc.) of those devices 302, 304 in a functionally adaptable manner to provide controlling commands and/or input to the applications associated with the GUI(s). Other forms of functionally adaptable user interfaces may also be implemented, such as an audio interface utilizing speech prompts output via the loudspeakers 917 and user voice commands input via the microphone 980. These other forms of functionally adaptable user interfaces may also be implemented on the provider device 304 and the requestor device 302.

Figure 10:
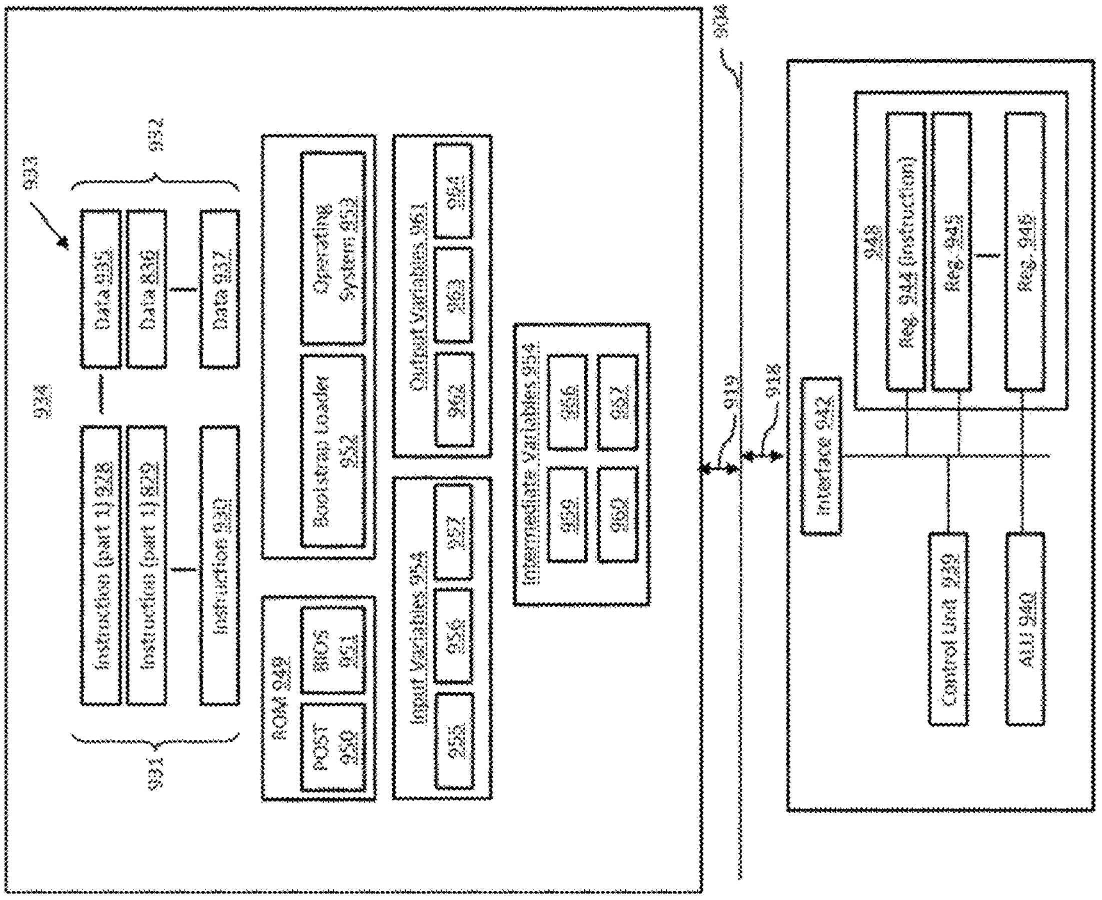
Figure 11:
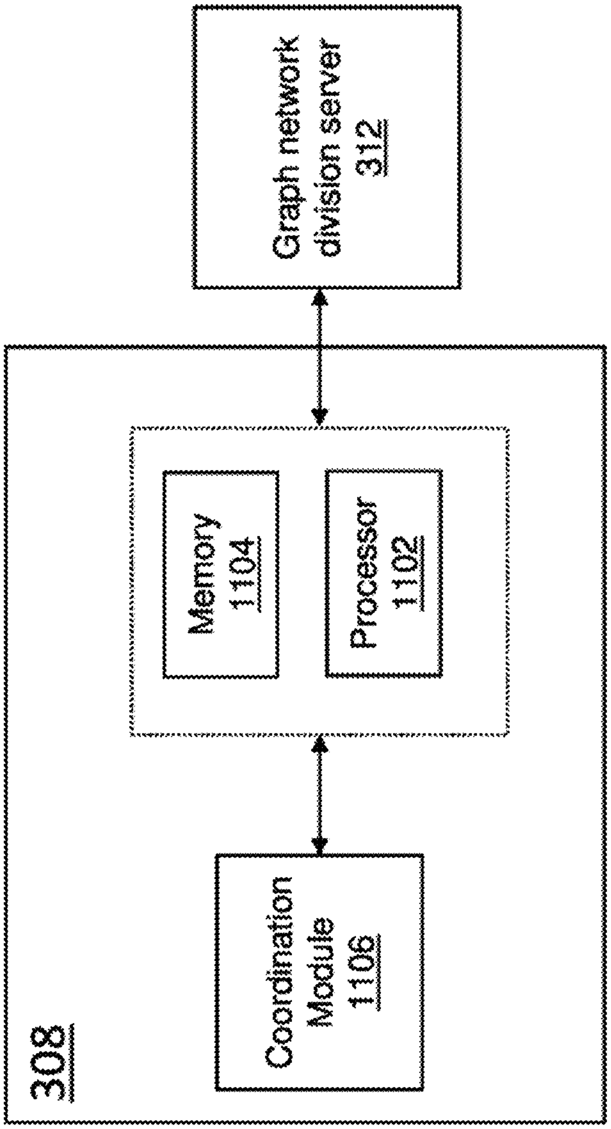
FIG. 11 shows an alternative computer device to implement the coordination server of FIG. 3.

FIG. 10 is a detailed schematic block diagram of the processor 905 and a "memory" 934. The memory 934 represents a logical aggregation of all the memory modules (including the HDD 909 and semiconductor memory 906) that can be accessed by the computer module 901 in FIG. 9.

When the computer module 901 is initially powered up, a power-on self-test (POST) program 950 executes. The POST program 950 is typically stored in a ROM 949 of the semiconductor memory 906 of FIG. 9. A hardware device such as the ROM 949 storing software is sometimes referred to as firmware. The POST program 950 examines hardware within the computer module 901 to ensure proper functioning and typically checks the processor 905, the memory 934 (609, 906), and a basic input-output systems software (BIOS) module 951, also typically stored in the ROM 949, for correct operation. Once the POST program 950 has run successfully, the BIOS 951 activates the hard disk drive 910 of FIG. 10. Activation of the hard disk drive 910 causes a bootstrap loader program 952 that is resident on the hard disk drive 910 to execute via the processor 905. This loads an operating system 953 into the RAM memory 906, upon which the operating system 953 commences operation. The operating system 953 is a system level application, executable by the processor 905, to fulfil various high level functions, including processor management, memory management, device management, storage management, software application interface, and generic user interface.

The operating system 953 manages the memory 934 (609, 906) to ensure that each process or application running on the computer module 901 has sufficient memory in which to execute without colliding with memory allocated to another process. Furthermore, the different types of memory available in the server 308 of FIG. 9 must be used properly so that each process can run effectively. Accordingly, the aggregated memory 934 is not intended to illustrate how particular segments of memory are allocated (unless otherwise stated), but rather to provide a general view of the memory accessible by the server 308 and how such is used.

As shown in FIG. 10, the processor 905 includes a number of functional modules including a control unit 939, an arithmetic logic unit (ALU) 940, and a local or internal memory 948, sometimes called a cache memory. The cache memory 948 typically includes a number of storage registers 944-946 in a register section. One or more internal busses 941 functionally interconnect these functional modules. The processor 905 typically also has one or more interfaces 942 for communicating with external devices via the system bus 904, using a connection 918. The memory 934 is coupled to the bus 904 using a connection 919.

The application program 933 includes a sequence of instructions 931 that may include conditional branch and loop instructions. The program 933 may also include data 932 which is used in execution of the program 233. The instructions 931 and the data 932 are stored in memory locations 928, 929, 930 and 935, 936, 937, respectively. Depending upon the relative size of the instructions 931 and the memory locations 928-630, a particular instruction may be stored in a single memory location as depicted by the instruction shown in the memory location 930. Alternately, an instruction may be segmented into a number of parts each of which is stored in a separate memory location, as depicted by the instruction segments shown in the memory locations 928 and 929.

In general, the processor 905 is given a set of instructions which are executed therein. The processor 905 waits for a subsequent input, to which the processor 905 reacts to by executing another set of instructions. Each input may be provided from one or more of a number of sources, including data generated by one or more of the input devices 902, 903, data received from an external source across one of the networks 920, 902, data retrieved from one of the storage devices 906, 909 or data retrieved from a storage medium 925 inserted into the corresponding reader 912, all depicted in FIG. 9. The execution of a set of the instructions may in some cases result in output of data. Execution may also involve storing data or variables to the memory 934.

The disclosed association management and payment initiation arrangements use input variables 954, which are stored in the memory 934 in corresponding memory locations 955, 956, 957. The association management and payment initiation arrangements produce output variables 961, which are stored in the memory 934 in corresponding memory locations 962, 963, 964. Intermediate variables 258 may be stored in memory locations 959, 960, 966 and 967.

Referring to the processor 905 of FIG. 9, the registers 944, 945, 946, the arithmetic logic unit (ALU) 940, and the control unit 939 work together to perform sequences of micro-operations needed to perform "fetch, decode, and execute" cycles for every instruction in the instruction set making up the program 933. Each fetch, decode, and execute cycle comprises: a fetch operation, which fetches or reads an instruction 931 from a memory location 928, 929, 930; a decode operation in which the control unit 939 determines which instruction has been fetched; and an execute operation in which the control unit 939 and/or the ALU 940 execute the instruction.

Thereafter, a further fetch, decode, and execute cycle for the next instruction may be executed. Similarly, a store cycle may be performed by which the control unit 939 stores or writes a value to a memory location 932.

Each step or sub-process in the processes of FIGS. 2 and 4-7 is associated with one or more segments of the program 933 and is performed by the register section 944, 945, 947, the ALU 940, and the control unit 939 in the processor 905 working together to perform the fetch, decode, and execute cycles for every instruction in the instruction set for the noted segments of the program 933.

It is to be understood that the structural context of the coordination server 308 is presented merely by way of example. Therefore, in some arrangements, one or more features of the coordination server 308 may be omitted. Also, in some arrangements, one or more features of the coordination server 308 may be combined. Additionally, in some arrangements, one or more features of the coordination server 308 may be split into one or more component parts.

FIG. 10 shows an alternative computer device to implement the coordination server 308 of FIG. 3 (i.e., the computer system 900). In the alternative implementation, the coordination server 308 may be generally described as a physical device comprising at least one processor 1102 and at least one memory 1104 including computer program codes. The at least one memory 1104 and the computer program codes are configured to, with the at least one processor 1102, cause the coordination server 308 to facilitate the operations described in the processes of FIGS. 2 and 5-7. The coordination server 308 may also include a coordination module 1106. The memory 1104 stores computer program code that the processor 902 compiles to have each of the modules 906 and 908 performs their respective functions.

With reference to FIGS. 1-7, the coordination module 1106 performs the function of communicating with the requestor device 102 and the provider device 104; and the acquirer server 106 and the issuer server 110 to respectively receive and transmit a transaction and graph network data. Further, the coordination module 1106 may provide data and information such as latent attributes associated with nodes, subnetwork and graph network, and graph neural networks processing parameters that are used for the graph network division/generation and subnetworks forming/reforming processes of the graph network division server 312.

FIG. 12 shows a schematic diagram of a general purpose computer system 1200 upon which the graph network division server 312 of FIG. 3 can be practiced. The computer system 1200 includes: a computer module 1201, input devices such as a keyboard 1202, a mouse pointer device 1203, a scanner 1226, a camera 1227, and a microphone 1280; and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The communications network 1220 may be a wide-area network (WAN), such as the Internet, a cellular telecommunications network, or a private WAN. Where the connection 1221 is a telephone line, the modem 1216 may be a traditional "dial-up" modem. Alternatively, where the connection 1221 is a high capacity (e.g., cable) connection, the modem 1213 may be a broadband modem. A wireless modem may also be used for wireless connection to the communications network 1220.

The input and output devices may be used by an operator who is interacting with the graph network division server 312. For example, the printer 1215 may be used to print reports relating to the status of the graph network division server 312.

The graph network division server 312 uses the communications network 1220 to communicate with the provider device 304, the requestor device 302, the coordination server 308 and the graph network database 313 to receive commands and data. The graph network division server 312 also uses the communications network 1220 to communicate with the provider device 304, the requestor device 302, the coordination server 312 and the database 328 to send notification messages or transaction and graph network data.

The computer module 1201 typically includes at least one processor unit 1205, and at least one memory unit 1206. For example, the memory unit 1206 may have semiconductor random access memory (RAM) and semiconductor read only memory (ROM). The computer module 1201 also includes a number of input/output (I/O) interfaces including: an audio-video interface 1207 that couples to the video display 1214, loudspeakers 1217 and microphone 1280; an I/O interface 1213 that couples to the keyboard 1202, mouse 1203, scanner 1226, camera 1227 and optionally a joystick or other human interface device (not illustrated); and an interface 1208 for the external modem 1216 and printer 1215. In some implementations, the modem 1216 may be incorporated within the computer module 1201, for example within the interface 1208. The computer module 1201 also has a local network interface 1211, which permits coupling of the computer system 1200 via a connection 223 to a local-area communications network 1222, known as a Local Area Network (LAN). As illustrated in FIG. 12, the local communications network 1222 may also couple to the wide network 1220 via a connection 1224, which would typically include a so-called "firewall" device or device of similar functionality. The local network interface 1211 may comprise an Ethernet circuit card, a Bluetooth© wireless arrangement or an IEEE 802.11 wireless arrangement; however, numerous other types of interfaces may be practiced for the interface 1211.

The I/O interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the graph network division server 312.

The components 1205 to 1213 of the computer module 1201 typically communicate via an interconnected bus 1204 and in a manner that results in a conventional mode of operation of a computer system known to those in the relevant art. For example, the processor 1205 is coupled to the system bus 1204 using a connection 1218. Likewise, the memory 1206 and optical disk drive 1212 are coupled to the system bus 1204 by connections 1219. Examples of computers on which the described arrangements can be practised include IBM-PC's and compatibles, Sun Sparcstations, Apple Mac™ or like computer systems.

The methods of operating the graph network division server 312, as shown in the processes of FIGS. 2 and 5-7, may be implemented as one or more software application programs 1233 executable within the graph network division server 312. In particular, the steps of the processes shown in FIGS. 2 and 5-7 are effected by instructions (see corresponding component 931 in FIG. 10) in the software (i.e., computer program codes) 1233 that are carried out within the graph network division server 312. The software instructions 931 may be formed as one or more code modules, each for performing one or more particular tasks. The software may also be divided into two separate parts, in which a first part and the corresponding code modules performs the operation of the graph network division server 312 and a second part and the corresponding code modules manages the API and corresponding user interfaces in the provider device 304, the requestor device 302, and on the display 1214. In other words, the second part of the software manages the interaction between (a) the first part and (b) any one of the provider device 304, the requestor device 302, and the operator of the server 312.

The software may be stored in a computer readable medium, including the storage devices described below, for example. The software is loaded into the graph network division server 312 from the computer readable medium, and then executed by the computer system 1200. A computer readable medium having such software or computer program recorded on the computer readable medium is a computer program product. The use of the computer program product in the graph network division server 312 preferably effects an advantageous apparatus for adaptively dividing a graph network into a plurality of subnetworks and reforming/refining the plurality of subnetworks.

The software (i.e., computer program codes) 1233 is typically stored in the HDD 1210 or the memory 1206. The software 1233 is loaded into the computer system 1200 from a computer readable medium (e.g., the memory 1206), and executed by the processor 1205. Thus, for example, the software 1233 may be stored on an optically readable disk storage medium (e.g., CD-ROM) 1225 that is read by the optical disk drive 1212. A computer readable medium having such software or computer program recorded on it is a computer program product. The use of the computer program product in the graph network division server 312 preferably effects an apparatus for adaptively dividing a graph network into a plurality of subnetworks and reforming/refining the plurality of subnetworks.

In some instances, the application programs 1233 may be supplied to the user encoded on one or more CD-ROMs 1225 and read via the corresponding drive 1212, or alternatively may be read by the user from the networks 1220 or 1222. Still further, the software can also be loaded into the graph network division server 312 from other computer readable media. Computer readable storage media refers to any non-transitory tangible storage medium that provides recorded instructions and/or data to the graph network division server 312 for execution and/or processing by the processor 1205. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1201. Examples of transitory or non-tangible computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the application programs 1233 and the corresponding code modules mentioned above may be executed to implement one or more API of the graph network division server 312 with associated graphical user interfaces (GUIs) to be rendered or otherwise represented upon the display 1214 or the display of the provider device 304 and the requestor device 302. Through manipulation of typically the keyboard 1202 and the mouse 1203, an operator of the server 312 and the application may manipulate the interface in a functionally adaptable manner to provide controlling commands and/or input to the applications associated with the GUI(s). Similarly, on the provider device 304 and the requestor device 302, a user of those devices 302, 304 manipulate the input devices (e.g., touch screen, keyboard, mouse, etc.) of those devices 302, 304 in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 680. These other forms of functionally adaptable user interfaces may also be implemented on the provider device 304 and the requestor device 302.

It is to be understood that the structural context of the coordination server 308 is presented merely by way of example. Therefore, in some arrangements, one or more features of the coordination server 308 may be omitted. Also, in some arrangements, one or more features of the graph network division server 312 may be combined. Additionally, in some arrangements, one or more features of the graph network division server 312 may be split into one or more component parts.

Figure 13:
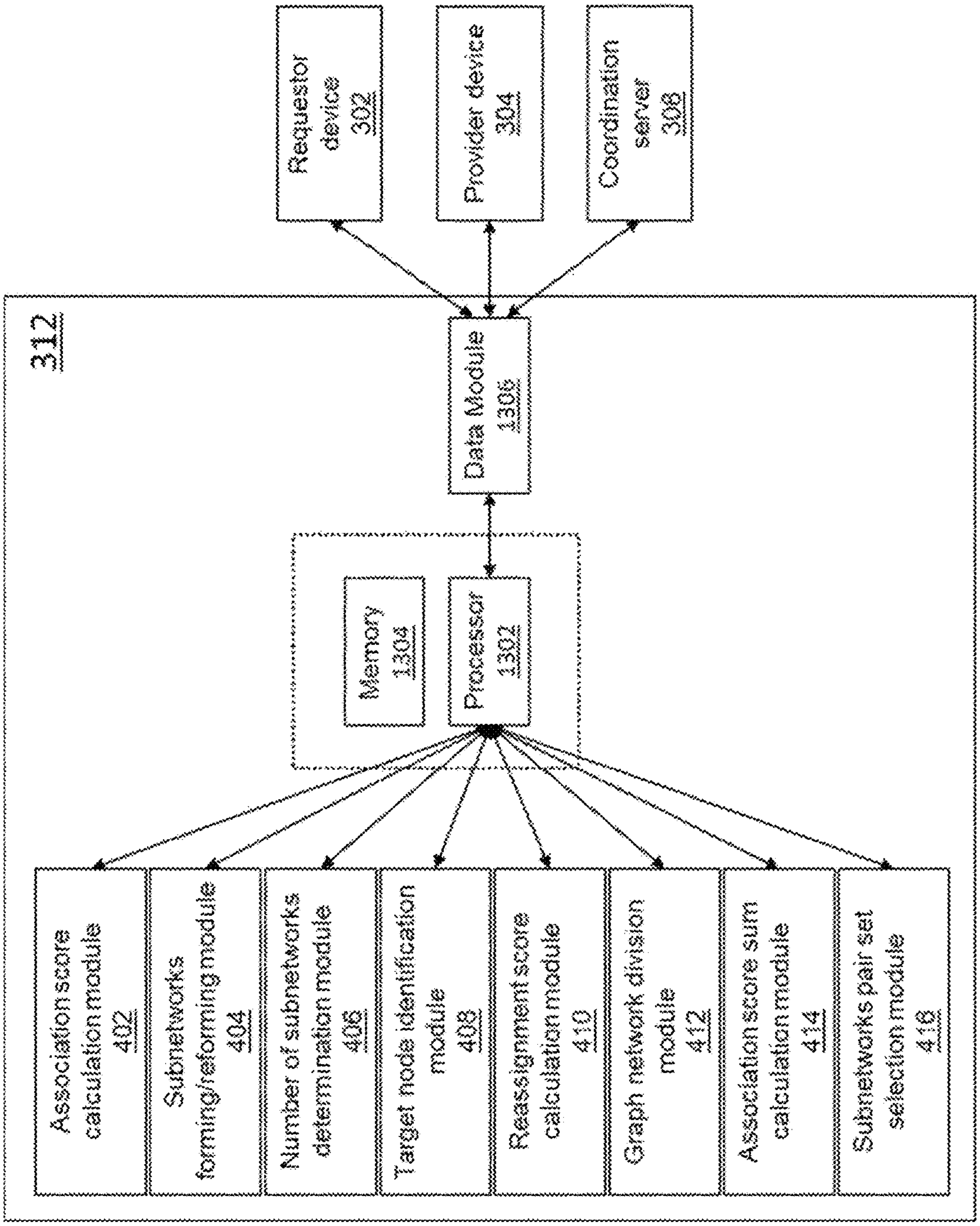
FIG. 13 shows an alternative computer device to implement the graph network division server of FIG. 3.

FIG. 13 shows an alternative computer device to implement the graph network division server 312 of FIG. 3. In the alternative implementation, the graph network division server 312 may be generally described as a physical device comprising at least one processor 1302 and at least one memory 1304 including computer program codes. The at least one memory 1304 and the computer program codes are configured to, with the at least one processor 1302, cause the graph network division server 312 of FIG. 3 to perform the operations described in the processes of FIGS. 2 and 5-7. The graph network division server 312 may include various modules 402, 404, 406, 408, 410, 412, 414, 416 of the system 400 described in FIG. 4. The memory 1304 stores computer program code that the processor 1302 compiles to have each of the modules 402, 404, 406, 408, 410, 412, 414, 416 performs their respective functions as described in FIG. 4 and its accompanying description.

The graph network division server 312 may also include a data module 1306 configured to perform the functions of receiving transaction and graph network data and information from the requestor device 302, provider device 304, coordination server 308, a cloud and other sources of information to facilitate the processes of FIGS. 2 and 4-7. For example, the data module 1306 may be configured to receive a request including latent attributes associated with nodes, subnetwork and graph network and/or their graph neural networks processing parameters from one user device (such as the requestor device 312 or the provider device 314) the coordination server 308 for use in the adaptive graph network division/generation and subnetworks forming/re-forming processes.

FIG. 14 shows a schematic diagram of a general purpose computer system upon which a combined coordination and graph network division server 308, 312 of FIG. 3 can be practiced. The computer system 1400 includes: a computer module 1401, input devices such as a keyboard 1402, a mouse pointer device 1403, a scanner 1426, a camera 1427, and a microphone 1480; and output devices including a printer 1415, a display device 1414 and loudspeakers 1417. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1413 may be a broadband modem. A wireless modem may also be used for wireless connection to the communications network 1220.

The input and output devices may be used by an operator who is interacting with the combined coordination and graph network division server 308, 312. For example, the printer 1415 may be used to print reports relating to the status of the combined coordination and graph network division server 308, 312.

The combined coordination and graph network division server 308, 312 uses the communications network 1420 to communicate with the provider device 304, the requestor device 302, and the databases 309, 313 to receive commands and data. In one example, the databases 309, 313 may be combined, as shown in FIG. 14. The combined coordination and graph network division server 308, 312 also uses the communications network 1420 to communicate with the provider device 304, the requestor device 302 and the databases 309, 313 to send notification messages or transaction and graph network data.

The computer module 1401 typically includes at least one processor unit 1405, and at least one memory unit 1406. For example, the memory unit 1406 may have semiconductor random access memory (RAM) and semiconductor read only memory (ROM). The computer module 1401 also includes a number of input/output (I/O) interfaces including: an audio-video interface 1407 that couples to the video display 1414, loudspeakers 1417 and microphone 1480; an I/O interface 1413 that couples to the keyboard 1402, mouse 1403, scanner 1426, camera 1427 and optionally a joystick or other human interface device (not illustrated); and an interface 1408 for the external modem 1416 and printer 1415. In some implementations, the modem 1416 may be incorporated within the computer module 1401, for example within the interface 1408. The computer module 1401 also has a local network interface 1411, which permits coupling of the computer system 1400 via a connection 223 to a local-area communications network 1422, known as a Local Area Network (LAN). As illustrated in FIG. 14, the local communications network 1422 may also couple to the wide network 1420 via a connection 1424, which would typically include a so-called "firewall" device or device of similar functionality. The local network interface 1411 may comprise an Ethernet circuit card, a Bluetooth® wireless arrangement or an IEEE 802.11 wireless arrangement; however, numerous other types of interfaces may be practiced for the interface 1411.

The I/O interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the combined coordination and graph network division server 308, 312.

The components 1405 to 1413 of the computer module 1401 typically communicate via an interconnected bus 1404 and in a manner that results in a conventional mode of operation of a computer system known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple Mac™ or like computer systems.

The methods of operating the combined coordination and graph network division server 308, 312, as shown in the processes of FIGS. 2 and 5-7, may be implemented as one or more software application programs 1433 executable within the combined coordination and graph network division server 308, 312. In particular, the steps of the processes shown in FIGS. 2 and 5-7 are effected by instructions (see corresponding component 931 in FIG. 10) in the software (i.e., computer program codes) 1433 that are carried out within the combined coordination and graph network division server 308, 312. The software instructions 931 may be formed as one or more code modules, each for performing one or more particular tasks. The software may also be divided into two separate parts, in which a first part and the corresponding code modules performs the operation of the combined coordination and graph network division server 308, 312 and a second part and the corresponding code modules manages the API and corresponding user interfaces in the provider device 304, the requestor device 302, and on the display 1414. In other words, the second part of the software manages the interaction between (a) the first part and (b) any one of the provider device 304, the requestor device 302, and the operator of the server 312.

The software may be stored in a computer readable medium, including the storage devices described below, for example. The software is loaded into the combined coordination and graph network division server 308, 312 from the computer readable medium, and then executed by the computer system 1400. A computer readable medium having such software or computer program recorded on the computer readable medium is a computer program product. The use of the computer program product in the combined coordination and graph network division server 308, 312 preferably effects an advantageous apparatus for adaptively dividing a graph network into a plurality of subnetworks and reforming/refining the plurality of subnetworks as well as for receiving/transmitting transaction data and/or graph network data including latent attributes associated with nodes, subnetwork and graph network and/or their graph neural networks processing parameters used for the adaptive graph network division and subnetworks refining/reforming processes.

The software (i.e., computer program codes) 1433 is typically stored in the HDD 1410 or the memory 1406. The software 1433 is loaded into the computer system 1400 from a computer readable medium (e.g., the memory 1406), and executed by the processor 1405. Thus, for example, the software 1433 may be stored on an optically readable disk storage medium (e.g., CD-ROM) 1425 that is read by the optical disk drive 1412. A computer readable medium having such software or computer program recorded on it is a computer program product. The use of the computer program product in the combined coordination and graph network division server 308, 312 preferably effects an apparatus for adaptively dividing a graph network into a plurality of subnetworks and reforming/refining the plurality of subnetworks as well as for receiving/transmitting transaction data and/or graph network data including latent attributes associated with nodes, subnetwork and graph network and/or their graph neural networks processing parameters used for the adaptive graph network division and subnetworks refining/reforming processes.

In some instances, the application programs 1433 may be supplied to the user encoded on one or more CD-ROMs 1425 and read via the corresponding drive 1412, or alternatively may be read by the user from the networks 1420 or 1422. Still further, the software can also be loaded into the combined coordination and graph network division server 308, 312 from other computer readable media. Computer readable storage media refers to any non-transitory tangible storage medium that provides recorded instructions and/or data to the combined coordination and graph network division server 308, 312 for execution and/or processing by the processor 1405. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more API of the combined coordination and graph network division server 308, 312 with associated graphical user interfaces (GUIs) to be rendered or otherwise represented upon the display 1414 or the display of the provider device 304 and the requestor device 302. Through manipulation of typically the keyboard 1402 and the mouse 1403, an operator of the server 312 and the application may manipulate the interface in a functionally adaptable manner to provide controlling commands and/or input to the applications associated with the GUI(s). Similarly, on the provider device 304 and the requestor device 302, a user of those devices 302, 304 manipulate the input devices (e.g., touch screen, keyboard, mouse, etc.) of those devices 302, 304 in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 680. These other forms of functionally adaptable user interfaces may also be implemented on the provider device 304 and the requestor device 302.

It is to be understood that the structural context of the coordination server 308 is presented merely by way of example. Therefore, in some arrangements, one or more features of the coordination server 308 may be omitted. Also, in some arrangements, one or more features of the combined coordination and graph network division server 308, 312 may be combined. Additionally, in some arrangements, one or more features of the combined coordination and graph network division server 308, 312 may be split into one or more component parts.

Figure 15:
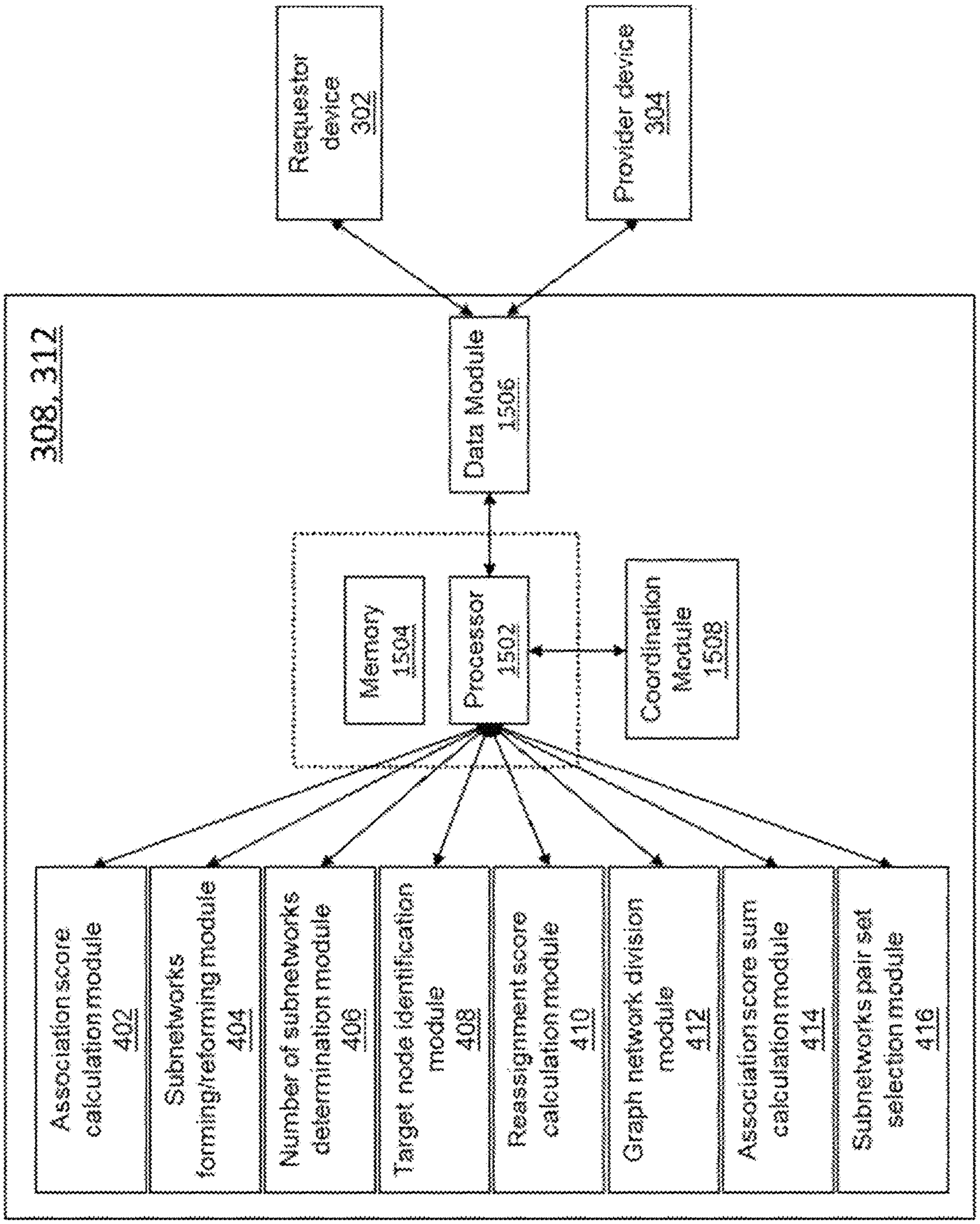
FIG. 15 shows an alternative computer device to implement a combined coordination and graph network division server of FIG. 3.

FIG. 15 shows an alternative computer device to implement a combined coordination and graph network division server 308, 312 of FIG. 3. In the alternative implementation, the combined coordination and graph network division server 308, 312 may be generally described as a physical device comprising at least one processor 1502 and at least one memory 1504 including computer program codes. The at least one memory 1504 and the computer program codes are configured to, with the at least one processor 1502, cause the combined coordination and graph network division server 308, 312 to perform the operations described in the processes of FIGS. 2 and 5-7. The combined coordination and graph network division server 308, 312 may include various modules 402, 404, 406, 408, 410, 412, 414, 416 of the system 400 described in FIG. 4. The memory 1304 stores computer program code that the processor 1502 compiles to have each of the modules 402, 404, 406, 408, 410, 412, 414, 416 performs their respective functions as described in FIG. 4 and its accompanying description.

The combined coordination and graph network division server 308, 312 may also include a coordination module 1508 configured to perform the function of communicating with the requestor device 102 and the provider device 104; and the acquirer server 106 and the issuer server 110 to respectively receive and transmit a transaction and graph network data such as latent attributes associated with nodes, subnetwork and graph network, and graph neural networks processing parameters that are used for the graph network division/generation and subnetworks forming/reforming processes of the graph network division server 312.

The combined coordination and graph network division server 308, 312 may also include a data module 1506 configured to perform the functions of receiving transaction and graph network data and information from the requestor device 302, provider device 304, coordination server 308, a cloud and other sources of information to facilitate the processes of FIGS. 2 and 4-7. For example, the data module 1506 may be configured to receive a request with data including latent attributes associated with nodes, subnetwork and graph network and/or their graph neural networks processing parameters from one user device (such as the requestor device 312 or the provider device 314) to perform adaptive graph network division/generation and subnetworks forming/reforming processes.

The foregoing describes only some embodiments of the present disclosure, and modifications and/or changes can be made thereto without departing from the scope and spirit of the invention, the embodiments being illustrative and not restrictive.

The invention claimed is:

1. A method for adaptively dividing a map into a plurality of submaps, the map comprising a plurality of roads, each of the plurality of roads being connected to at least one other road of the plurality of roads, the method comprising:

receiving a request for at least one of a good or service from a computing requestor device, the request including data indicative of latent attributes associated with each of the plurality of roads;

allocating one or more graph neural network models for each submap within the map;

training a set of parameters of each of the graph neural network models on its allocated submap within the map using data of roads within the allocated submap;

calculating, for cach pair of submaps from the plurality of submaps within the map, an association score determined by one of the trained graph neural network models and based on a first accuracy metric of predicting a first latent attribute of at least one first road of a first submap of respective of the pair of submaps using parameters for predicting a second latent attribute of at least one second road of a second submap of the respective pair of submaps;

forming one of a plurality of new submaps within the map from each pair of a pair set of submaps from the plurality of submaps based on a result of determining a sum of the association scores of the pair set of submaps is higher than that of another pair set of submaps from the plurality of submaps; and route, in response to the request, a service provider within one of the plurality of new submaps within the map to fulfill the request.

2. The method of claim 1, wherein the association score is calculated by one of the trained graph neural network models is further based on a second accuracy metric in predicting the second latent attribute of the at least one second road of the second submap using parameters for predicting the first latent attribute of the at least one first road of the first submap.

3. The method of claim 2, further comprising:

determining if the first accuracy metric is higher than a third accuracy metric in predicting the first latent attribute of the at least one first road of the first submap of the each pair of submaps using the parameters for predicting the first latent attribute of the at least one first road of the first submap and/or the second accuracy metric is higher than a fourth accuracy metric in predicting the second latent attribute of the at least one second road of the second submap of the each pair of submaps using the parameters for predicting the second latent attribute of the at least one second road of the second submaps; wherein forming the one of the plurality of new submaps within the map from the each pair of submaps is carried out in response to the determination of the first accuracy metric being higher than the third accuracy metric and/or the second accuracy metric being higher than the fourth accuracy metric.

4. The method of claim 1, wherein the association score is calculated by one of the trained graph neural network models and further based on a degree of connectedness between roads in the first subnetwork and the second submap of the each pair of submaps of the plurality of submaps.

5. The method of claim 1, further comprising:

determining if the number of submaps within the map is higher than a pre-configured threshold number of submaps, wherein the calculation of the association scores is carried out in response to the determination of the number of submaps being higher than the preconfigured threshold number of submaps.

6. The method of claim 1, further comprising:

identifying a third road in a target submap of the plurality of submaps based on a highest fifth accuracy metric in predicting a third latent attribute of the third road using parameters for predicting the third latent attribute of the third road;

for each of the remaining submaps of the plurality of the submaps, calculating a reassignment score to assign the third road to the each of the remaining submaps based on a sixth accuracy metric in predicting the third latent attribute of the third road using parameters for predicting a fourth latent attribute of at least one fourth road of the each of the remaining submaps; and reforming the target submap to remove the third road from the target submap and one of the remaining submaps with a highest reassignment score from the calculated reassignment scores to further comprise the third road.

7. The method of claim 6, further comprising:

determining if the sixth accuracy metric associated with the highest reassignment score from the calculated reassignment scores is higher than the fifth accuracy metric, wherein reforming the target submap to remove the third road from the target submap and the one of the remaining submaps to further comprise the third road is carried out in response to the determination of the sixth accuracy metric being higher than the fifth accuracy metric.

8. The method of claim 1, further comprising:

dividing the map into a plurality of submaps, wherein the calculation of the association scores is carried out based on the plurality of divided submaps.

9. The method of claim 1, further comprising:

calculating a sum of the association scores of each of a plurality of pair sets of submaps; and selecting a pair set of submaps from the plurality of pair sets of submaps with a highest sum among the sums of the association scores, wherein the one of the plurality of new submaps within the map is formed from each pair of the pair set of submaps with the highest sum.

10. The method of claim 1, wherein each of the plurality of submaps exclusively comprises one or more roads of the plurality of roads, and wherein the step of predicting a latent attribute of a road corresponds to a step of predicting at least one of a number of points of interest (POIs) on the map that are accessible from the road, a type of the road, an average traffic speed on the road at a given time and an average number of vehicles traversing the road at a given time.

11. A system for adaptively dividing a map into a plurality of submaps, the map comprising a plurality of roads, each of the plurality of roads being connected to at least one other road of the plurality of roads, the system comprising:

at least one processor; and at least one memory including computer program code;

the at least one memory and the computer program code configured to, with the at least one processor, cause the system at least to:

receive a request for at least one of a good or service from a computing requestor device, the request including data indicative of latent attributes associated with each of the plurality of roads;

allocate one or more graph neural network models for each submap within the map;

train a set of parameters of each of the graph neural network models on its allocated submap within the map using data of roads within the allocated submap;

calculate, for each pair of submaps from the plurality of submaps within the map, an association score determined by one of the trained graph neural network models and based on a first accuracy metric in predicting a first latent attribute of at least one first road of a first submap of the respective pair of submaps using parameters for predicting a second latent attribute of at least one second road of a second submap of the respective pair of submaps;

form one of a plurality of new submaps within the map from each pair of a pair set of submaps from the plurality of submaps based on a result of determining a sum of the association scores of the pair set of submaps is higher than that of all pairs in the pair set of submaps from the plurality of submaps; and routing, in response to the request, a service provider within one of the plurality of new submaps within the map to fulfill the request.

12. The system of claim 11, wherein the at least one memory and the computer program code configured to, with the at least one processor, cause the system at least to further: calculate the association score determined by one of the trained graph neural network models and based on a second accuracy metric in predicting the second latent attribute of the at least one second road of the second subnetwork using parameters for predicting the first latent attribute of the at least one first road of the first subnetwork.

13. The system of claim 12, wherein the at least one memory and the computer program code configured to, with the at least one processor, cause the system at least to further: determine if the first accuracy metric is higher than a third accuracy metric in predicting the first latent attribute of the at least one first road of the first subnetwork of the each pair of submaps using the parameters for predicting the first latent attribute of the at least one first road of the first submap and/or the second accuracy metric is higher than a fourth accuracy metric in predicting the second latent attribute of the at least one second road of the second subnetwork of the each pair of submaps using the parameters for predicting the second latent attribute of the at least one second road of the second submap; and form the one of the plurality of new submaps within the map from the each pair of submaps is carried out in response to the determination of the first accuracy metric being higher than the third accuracy metric and/or the second accuracy metric being higher than the fourth accuracy metric.

14. The system of claim 11, wherein the at least one memory and the computer program code configured to, with the at least one processor, cause the system at least to further:

calculate the association score determined by one of the trained graph neural network models and based on a degree of connectedness between roads in the first submap and the second submap of the each pair of submaps of the plurality of submaps.

15. The system of claim 11, wherein the at least one memory and the computer program code configured to, with at least one processor, cause the system at least to further:

determine if the number of submaps within the map is higher than a pre-configured threshold number of submaps, wherein the calculation of the association scores is carried out in response to the determination of the number of submaps being higher than the preconfigured threshold number of submaps.

16. The system of claim 11, wherein the at least one memory and the computer program code configured to, with the at least one processor, cause the system at least to further:

identifying a third road in a target submap of the plurality of submaps based on a highest fifth accuracy metric in predicting a third latent attribute of the third road using parameters for predicting the third latent attribute of the third road;

for each of the remaining submaps of the plurality of the submaps, calculating a reassignment score to assign the third road to the each of the remaining submaps based on a sixth accuracy metric in predicting the third latent attribute of the third road using parameters for predicting a fourth latent attribute of at least one fourth road of the each of the remaining submaps; and reforming the target submap to remove the third road from the target submap and one of the remaining submaps with a highest reassignment score from the calculated reassignment scores to further comprise the third road.

17. The system of claim 16, further comprising:

determine if the sixth accuracy metric is higher than the fifth accuracy metric in predicting the third latent attribute of the at least one third road of the target submap; and reform the target subnetwork to remove the third road from the target submap and the one of the remaining submaps with the highest reassignment score from the calculated reassignment score to further comprise the third road is carried out in response to the determination of the sixth accuracy metric being higher than the fifth accuracy metric.

18. The system of claim 11, wherein the at least one memory and the computer program code configured to, with the at least one processor, cause the system at least to further:

divide the map into a plurality of submaps, wherein the at least one memory and the computer program code configured to, with at least one processor, cause the system at least to calculate the association scores determined by one of the trained graph neural network models and based on the plurality of divided submaps.

19. The system of claim 11, the at least one memory and the computer program code configured to, with the at least one processor, cause the system at least to further:

calculate a sum of the association scores of each of a plurality of pair sets of submaps; and select a pair set of submaps from the plurality of pair sets of submaps with a highest sum among the sums of the association scores, wherein the one of the plurality of new submaps within the map is formed from each pair of the pair set of submaps with the highest sum.

20. The system of claim 11, wherein each of the plurality of submaps exclusively comprises one or more roads of the plurality of roads, and wherein the step predicting a latent attribute of a road corresponds to a step of predicting at least one of a number of points of interest (POIs) on the map that are accessible from the road, a type of the road, an average traffic speed on the road at a given time and an average number of vehicles traversing the road at a given time.

* * * * *